(12) United States Patent
Okabe et al.

(10) Patent No.: US 9,040,632 B2
(45) Date of Patent: *May 26, 2015

(54) GOLF BALL

(71) Applicant: DUNLOP SPORTS CO. LTD., Kobe-shi, Hyogo (JP)

(72) Inventors: Satoko Okabe, Kobe (JP); Keiji Ohama, Kobe (JP)

(73) Assignee: DUNLOP SPORTS CO. LTD., Kobe (JP)

( * ) Notice: Subject to any disclaimer, the term of this patent is extended or adjusted under 35 U.S.C. 154(b) by 160 days.

This patent is subject to a terminal disclaimer.

(21) Appl. No.: 13/774,651

(22) Filed: Feb. 22, 2013

(65) Prior Publication Data

US 2013/0165265 A1 Jun. 27, 2013

Related U.S. Application Data

(63) Continuation of application No. 12/498,138, filed on Jul. 6, 2009, now Pat. No. 8,501,871.

(30) Foreign Application Priority Data

Jul. 11, 2008 (JP) ................................. 2008-181892
Dec. 19, 2008 (JP) ................................. 2008-323356
Jun. 11, 2009 (JP) ................................. 2009-140164

(51) Int. Cl.
*A63B 37/00* (2006.01)
*A63B 37/12* (2006.01)
*C08L 77/00* (2006.01)
*C08L 23/08* (2006.01)
*C08L 33/10* (2006.01)

(52) U.S. Cl.
CPC ......... *A63B 37/0038* (2013.01); *C08L 23/0876* (2013.01); *A63B 37/0003* (2013.01); *A63B 37/0039* (2013.01); *A63B 37/004* (2013.01); *A63B 37/0043* (2013.01); *A63B 37/0086* (2013.01); *C08L 33/10* (2013.01); *C08L 77/00* (2013.01)

(58) Field of Classification Search
None
See application file for complete search history.

(56) References Cited

U.S. PATENT DOCUMENTS

| 5,047,478 | A | 9/1991 | Ohmae et al. |
| 5,091,478 | A | 2/1992 | Saltman |
| 5,176,952 | A | 1/1993 | Joseph et al. |
| 5,210,138 | A | 5/1993 | Yamamoto et al. |
| 5,288,242 | A | 2/1994 | Muzslay |
| 5,587,236 | A | 12/1996 | Agrawal et al. |
| 5,605,968 | A | 2/1997 | Egashira et al. |
| 5,656,695 | A | 8/1997 | Endo et al. |
| 5,713,802 | A | 2/1998 | Moriyama et al. |
| 5,789,021 | A | 8/1998 | Dooms et al. |
| 5,820,486 | A | 10/1998 | Tanaka et al. |
| 5,886,103 | A | 3/1999 | Bellinger et al. |
| 5,889,114 | A | 3/1999 | Statz |
| 5,919,862 | A | 7/1999 | Rajagopalan |
| 5,976,034 | A | 11/1999 | Kato et al. |
| 6,045,460 | A | 4/2000 | Hayashi et al. |
| 6,187,864 | B1 | 2/2001 | Rajagopalan |
| 6,274,669 | B1 | 8/2001 | Rajagopalan |
| 6,284,840 | B1 | 9/2001 | Rajagopalan et al. |
| 6,353,058 | B1 | 3/2002 | Rajagopalan |
| 6,468,169 | B1 | 10/2002 | Hayashi et al. |
| 6,486,250 | B1 | 11/2002 | Rajagopalan |
| 6,702,694 | B1 | 3/2004 | Watanabe |
| 6,762,244 | B2 | 7/2004 | Rajagopalan et al. |
| 6,800,690 | B2 | 10/2004 | Rajagopalan et al. |
| 6,966,849 | B2 | 11/2005 | Kato |
| 7,393,288 | B2 | 7/2008 | Egashira et al. |
| 7,393,289 | B2 | 7/2008 | Egashira et al. |
| 8,188,186 | B2 * | 5/2012 | Okabe ............................ 525/133 |
| 8,372,915 | B2 * | 2/2013 | Ohama et al. ................. 525/133 |
| 8,399,564 | B2 * | 3/2013 | Okabe ............................ 525/179 |
| 8,501,871 | B2 * | 8/2013 | Okabe et al. ................... 525/179 |
| 2002/0013413 | A1 | 1/2002 | Bellinger et al. |
| 2002/0098915 | A1 | 7/2002 | Cavallaro et al. |
| 2002/0147280 | A1 | 10/2002 | Rajagopalan |

(Continued)

FOREIGN PATENT DOCUMENTS

JP 60-60867 A 4/1985
JP 62-22841 A 1/1987

(Continued)

OTHER PUBLICATIONS eFunda.com, "Properties of Polyamide {nylon (PA 12), molding and extrusion compound}", eFunda Polymers, http://www.efunda.com/materials/polymers/properties/polymer_datasheet.cfm?MajorID=PA&MinorID=81 (retrieved from the Internet Aug. 7, 2013), pp. 1-2.
United States Office Action for U.S. Appl. No. 12/647,122 dated Aug. 13, 2013.
U.S. Office Action, dated Aug. 18, 2014, for U.S. Appl. No. 12/647,122.
Dupont, "Surlyn resins Product Data Sheet", DuPont Packaging & Industrial Polymers, Jan. 7, 2010, p. 1-3.
English translation of a Japanese Office Action for Japanese Application No. 2008-335265, dated Dec. 11, 2012.

(Continued)

*Primary Examiner* — David Buttner
(74) *Attorney, Agent, or Firm* — Birch, Stewart, Kolasch & Birch, LLP

(57) ABSTRACT

An object of the present invention is to provide a golf ball having an excellent properties like flight distance and low temperature durability. The present invention provides a golf ball comprising: a core consisting of a center and one or more intermediate layers covering the center; and a cover covering the core, wherein at least one piece or one layer of said intermediate layers is formed from a highly elastic intermediate layer composition that contains (A) a highly elastic polyamide resin having a flexural modulus in a range from 700 MPa to 5,000 MPa; (B) a metal-neutralized product of ethylene-(meth)acrylic acid copolymer and (C) a resin having a polar functional group in a specific way.

4 Claims, 1 Drawing Sheet

(56) References Cited

U.S. PATENT DOCUMENTS

| | | |
|---|---|---|
| 2003/0104879 A1 | 6/2003 | Iwami |
| 2004/0029648 A1 | 2/2004 | Kato |
| 2004/0053706 A1 | 3/2004 | Kennedy, III et al. |
| 2004/0116211 A1 | 6/2004 | Sullivan et al. |
| 2004/0121856 A1 | 6/2004 | Iwami |
| 2004/0142770 A1 | 7/2004 | Watanabe |
| 2004/0209708 A1 | 10/2004 | Bulpett et al. |
| 2004/0235587 A1 | 11/2004 | Sullivan et al. |
| 2006/0063893 A1 | 3/2006 | Rajagopalan |
| 2006/0116220 A1 | 6/2006 | Ohama et al. |
| 2006/0270492 A1 | 11/2006 | Higuchi et al. |
| 2006/0293121 A1 | 12/2006 | Egashira et al. |
| 2007/0049419 A1 | 3/2007 | Egashira et al. |
| 2007/0111823 A1 | 5/2007 | Higuchi et al. |
| 2007/0142128 A1 | 6/2007 | Watanabe |
| 2007/0281802 A1 | 12/2007 | Watanabe et al. |
| 2007/0281804 A1 | 12/2007 | Kamino et al. |
| 2008/0076604 A1 | 3/2008 | Watanabe |
| 2008/0161131 A1 | 7/2008 | Ladd et al. |
| 2008/0161133 A1 | 7/2008 | Sullivan et al. |
| 2008/0220900 A1 | 9/2008 | Komatsu |
| 2008/0227569 A1 | 9/2008 | Egashira et al. |
| 2008/0242447 A1 | 10/2008 | Egashira et al. |
| 2008/0254914 A1 | 10/2008 | Manami et al. |
| 2009/0270203 A1 | 10/2009 | Okabe |
| 2009/0280927 A1 | 11/2009 | Sullivan et al. |
| 2010/0009776 A1 | 1/2010 | Okabe et al. |
| 2010/0093466 A1 | 4/2010 | Ohama et al. |
| 2010/0167841 A1 | 7/2010 | Okabe et al. |
| 2010/0167842 A1 | 7/2010 | Okabe |
| 2011/0237348 A1 | 9/2011 | Okabe |
| 2012/0094783 A1* | 4/2012 | Okabe ............... 473/373 |

FOREIGN PATENT DOCUMENTS

| | | |
|---|---|---|
| JP | 63-146928 A | 6/1988 |
| JP | 2-51544 A | 2/1990 |
| JP | 3-64343 A | 3/1991 |
| JP | 6-145486 A | 5/1994 |
| JP | 9-38238 A | 2/1997 |
| JP | 9-248351 A | 9/1997 |
| JP | 10-179802 A | 7/1998 |
| JP | 10-314341 A | 12/1998 |
| JP | 10-328326 A | 12/1998 |
| JP | 2001-509204 A | 7/2001 |
| JP | 2001-514561 A | 9/2001 |
| JP | 2003-48286 A | 2/2003 |
| JP | 2003-504089 A | 2/2003 |
| JP | 2003-111870 A | 4/2003 |
| JP | 2003-159351 A | 6/2003 |
| JP | 2004-59656 A | 2/2004 |
| JP | 2004-75776 A | 3/2004 |
| JP | 2004-97802 A | 4/2004 |
| JP | 2004-130072 A | 4/2004 |
| JP | 2004/187991 A | 7/2004 |
| JP | 2004-188207 A | 7/2004 |
| JP | 2004-305754 A | 11/2004 |
| JP | 2005-112990 A | 4/2005 |
| JP | 2006-326301 A | 12/2006 |
| JP | 2007-622 A | 1/2007 |
| JP | 2007-61605 A | 3/2007 |
| JP | 2008-69463 A | 3/2008 |
| JP | 2009-261792 A | 11/2009 |
| JP | 2010-17414 A | 1/2010 |
| WO | WO 99/08756 A1 | 2/1999 |

OTHER PUBLICATIONS

English translation of a Japanese Questioning for Japanese Application No. 2008-335261, dated Dec. 11, 2012.
English translation of Japanese Questioning forJapanese Application No. 2008-335262, dated Dec. 11, 2012.
English translation of the Japanese Office Action dated Apr. 19, 2011, for Application No. 2008-335261.
English translation of the Japanese Office Action dated Apr. 19, 2011, for Application No. 2008-335262.
English translation of the Japanese Office Action dated Apr. 19, 2011, for Application No. 2008-335265.
English translation of the Japanese Office Action dated Dec. 27, 2011 for Application No. 2008-264249.
English translation of the Japanese Office Action dated Jan. 17, 2012 for Application No. 2008-335265.
English translation of the Japanese Office Action dated Jan. 17, 2012, for Application No. 2008-335261.
English translation of the Japanese Office Action dated Jan. 17, 2012, for Application No. 2008-335262.
English translation of the Japanese Office Action dated Jul. 10, 2012, for Japanese Application No. 2009-140164.
English translation of the Japanese Office Action dated Jun. 12, 2012, for Application No. 2008-335261.
English translation of the Japanese Office Action dated Jun. 12, 2012, for Application No. 2008-335262.
English translation of the Japanese Office Action dated Mar. 22, 2011, for Application No. 2008-264249.
Japanese Office Action for Japanese Application No. 2008-181892 dated Aug. 28, 2012.
Japanese Office Action with English Translation dated May 15, 2012 for Application No. 2008-117574.
Japanese Office Action with the English translation dated Feb. 21, 2012, for Application No. 2008-117574.
MatWeb website description of Flexural Strength Testing of Plastics; no date.
Office Action for corresponding U.S. Appl. No. 12/647,122 dated Oct. 12, 2012.
Questioning for Japanese Application No. 2008-335265 dated Jul. 30, 2012.
Thain, Eric; Science and Golf IV, Proceedings of the World Scientific Congress of Golf; 2002, pp. 319-327.
U.S. Office Action dated Jun. 13, 2012, for U.S. Appl. No. 12/574,462.
U.S. Office Action dated Jun. 13, 2012, for U.S. Appl. No. 12/647,127.
U.S. Office Action dated Oct. 20, 2011, for U.S. Appl. No. 12/425,746.
US Office Action dated May 21, 2012 for U.S. Appl. No. 12/647,122.
English translation of the Japanese Office Action for Japanese Application No. 2008-335261 dated Feb. 27, 2013.
English translation of the Japanese Office Action for Japanese Application No. 2008-335262 dated Feb. 27, 2013.
English translation of the Japanese Office Action for Japanese Application No. 2008-335265 dated Feb. 26, 2013.
United States Office Action for U.S. Appl. No. 12/647,122 dated Feb. 20, 2014.
United States Office Action for U.S. Appl. No. 13/046,867 dated Jan. 21, 2014.
US Office Action for U.S. Appl. No. 13/046,867 dated Sep. 30, 2013.
English translation of an Office Action for Japanese Application No. 2010-073290, dated Apr. 2, 2013.

* cited by examiner

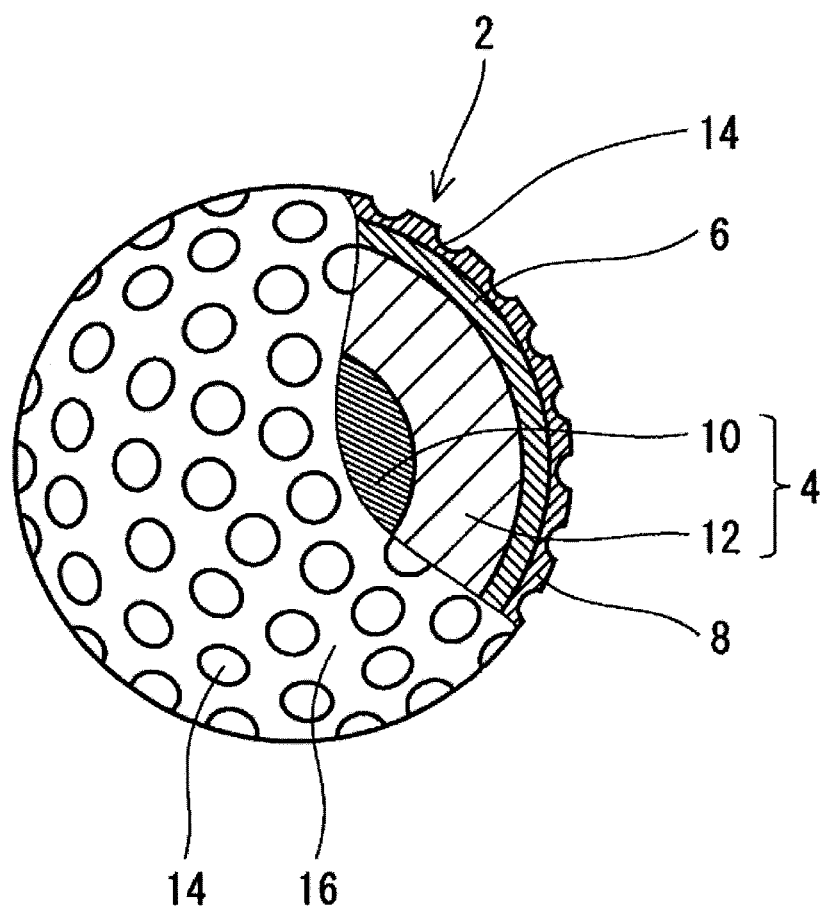

GOLF BALL

CROSS REFERENCE

The present application is a 37 C.F.R. §1.53(b) continuation of, and claims priority to, U.S. application Ser. No. 12/498,138 filed Jul. 6, 2009 now U.S. Pat. No. 8,501,871. Priority is also claimed to Japanese Application No. 2008-181892 filed on Jul. 11, 2008, Japanese Application No. 2008-323356 filed on Dec. 19, 2008 and Japanese Application No. 2009-140164 filed on Jun. 11, 2009. The entire contents of each of these applications is hereby incorporated by reference.

FIELD OF THE INVENTION

The present invention relates to a golf ball having excellent flight distance and low temperature durability, in particular, relates to a golf ball having a multi-layer structure having a core consisting of a center and one or more intermediate layers covering the center; and a cover covering the core.

DESCRIPTION OF THE RELATED ART

Most important requirement of golfers to golf balls is a flight performance. Golfers focus on the flight performance on shots with a driver, a long iron or a short iron. Flight performance has a relation to the repulsive performance of the golf ball. If the golf ball having an excellent repulsive performance is struck, the golf ball travels with high speed and thus the great distance will be obtained. Flight performance also has a relation to the spin rate. If the golf ball travels at a low spin rate, the appropriate trajectory is produced and thus the great distance will be obtained. In view of the flight performance, the golf ball with a high repulsion and a low spin rate is desired. Further, golfers focus on the shot feeling of the golf ball. Golfers prefer soft shot feeling.

Golfers also focus on a spin performance of the golf ball. If the back spin rate is high, the run becomes small. If the golfers can impart back spin to the golf ball, the back spin will make the golf ball stop at the aimed point. High side spin rate makes the golf ball curve easily. The golfer can impart intentionally curves to a golf ball having high side spin. The golf ball with higher spin rate is excellent in control. The highly skilled golfers focus on control, especially on shots with a short iron.

Various golf balls having a multi-layer structure have been proposed. Japanese Patent Publication No. H09-248351 A (JP 3994228 B) discloses a golf ball having a core, an inner cover, an intermediate layer, and an outer cover. Japanese Patent Publication No. 2004-130072 A discloses a golf ball having a core and a cover, wherein the core has a three-layered structure.

Various materials have been studied for a cover. Japanese Patent Publication No. H10-314341 A discloses a cover composition comprising an ionomer resin and a functional copolymer. Japanese Patent Publication No. 2001-509204 T discloses a cover composition comprising an ionomer resin and a nonionic polymer. Japanese Patent Publication No. 2007-622 A discloses a golf ball material that essentially contains the following components (A) to (C): (A) an ionomer, (B) a resin composition including one or more types selected from a group consisting of diene-based polymers, thermoplastic polymers, and thermosetting polymers; and (C) an acid group-containing thermoplastic resin composition.

SUMMARY OF THE INVENTION

Requirements of golf balls are escalating. Conventionally, in three-piece golf balls and multi-piece golf balls, ionomer resins having a high acid content and ionomer resins having a high degree of neutralization are used in the composition for an intermediate layer to enhance the rigidity of the intermediate layer, thereby increasing the launch angle and reducing the spin rate. By doing so, golf balls having improved flight distance are developed.

However, when ionomer resins having a large acid amount are used in the intermediate layer composition, there is a problem that the durability of the golf ball deteriorates. Further, when ionomer resins having a high degree of neutralization are used in the intermediate layer composition, there is a problem that the moldability of the intermediate layer composition deteriorates. Japanese Patent Publication Nos. H10-314341 A, 2001-509204T, 2007-622 A disclose materials intending a high rigidity, but the flight performance and the low temperature durability of the golf ball are not studied, when these materials are used for the intermediate layers of the golf ball. The object of the invention is to provide a golf ball excellent in various properties such as the flight performance and low temperature durability.

(1) The present invention that can solve the above problems provides a golf ball comprising:

a core consisting of a center and one or more intermediate layers covering the center; and a cover covering the core, wherein at least one piece or one layer of said intermediate layers is formed from a highly elastic intermediate layer composition that contains (A) a highly elastic polyamide resin having a flexural modulus in a range from 700 MPa to 5,000 MPa;

(B) a metal-neutralized product of ethylene-(meth)acrylic acid copolymer in an amount ratio ((A)/(B)) of (A) the highly elastic polyamide resin to (B) the metal-neutralized product of ethylene-(meth)acrylic acid copolymer being (20 mass % to 80 mass %)/(80 mass % to 20 mass %) (the total is 100 mass %); and (C) a resin having a polar functional group in an amount of 0.1 part by mass to 30 parts by mass with respect to 100 parts by mass of the sum of (A) the highly elastic polyamide resin and (B) the metal-neutralized product of ethylene-(meth)acrylic acid copolymer.

The present invention further provides a golf ball comprising:

a core consisting of a center and one or more intermediate layers covering the center; and a cover covering the core, wherein at least one piece or one layer of said intermediate layers is formed from a highly elastic intermediate layer composition that contains (A) a highly elastic polyamide resin having a flexural modulus in a range from 700 MPa to 5,000 MPa;

(B) a metal-neutralized product of ethylene-(meth)acrylic acid copolymer; and (C) a resin having a polar functional group, and the highly elastic intermediate layer composition has a hardness in a range from 65 to 75 in Shore D hardness, a flexural modulus in a range from 300 MPa to 1,000 MPa, and a tensile modulus in a range from 400 MPa to 1,500 MPa regarding slab properties.

The present invention further provides a golf ball comprising:

an outer core consisting of a center and one or more intermediate layers covering the center; and a cover covering the outer core, wherein the outer core consists of an inner core having the center and a surrounding layer disposed outside the center, and the intermediate layer disposed outside the inner core, and the inner core has a surface hardness H4 which is equal to or less than the surface hardness H6 of the outer core, and the cover has a hardness H7 of 50 or less in Shore D hardness, wherein the intermediate layer is formed from a highly elastic intermediate layer composition that contains:

(A) a highly elastic polyamide resin having a flexural modulus in a range from 700 MPa to 5,000 MPa;

(B) a metal-neutralized product of ethylene-(meth)acrylic acid copolymer in an amount ratio ((A)/(B)) of (A) the highly elastic polyamide resin to (B) the metal-neutralized product of ethylene-(meth)acrylic acid copolymer being (20 mass % to 80 mass %)/(80 mass % to 20 mass %) (the total is 100 mass %); and (C) a resin having a polar functional group in an amount of 0.1 part by mass to 30 parts by mass with respect to 100 parts by mass of the sum of (A) the highly elastic polyamide resin and (B) the metal-neutralized product of ethylene-(meth) acrylic acid copolymer.

Namely, the highly elastic intermediate layer composition of the present invention contains (A) the highly elastic polyamide resin having a high flexural modulus, (B) the metal-neutralized product of ethylene-(meth)acrylic acid copolymer having a high fluidity, and (C) the resin having a polar functional group. The component (A) enhances the resilience of the intermediate layer composition and further improves the low temperature durability. The component (B) improves the repulsion and the fluidity. The component (C) improves the interface strength between the component (A) and the component (B) without sacrificing the fluidity of the intermediate layer composition. Forming the intermediate layer from the highly elastic intermediate layer composition provides the intermediate layer with the high elasticity and the improved low temperature durability. Thus, the core is designed to have a high repulsion and a hardness distribution of an outer-hard inner-soft, resulting in a high launch angle and low spin when struck with a driver or the like, which gives a long flight distance. Further, the low temperature durability of the golf ball is improved.

According to the present invention, a golf ball having an excellent properties like flight distance and low temperature durability is obtained.

BRIEF DESCRIPTION OF THE DRAWINGS

FIG. 1 is a partially cutaway view of the preferred embodiment of the present invention.

DESCRIPTION OF THE PREFERRED EMBODIMENT

The present invention provides a golf ball comprising:

a core consisting of a center and one or more intermediate layers covering the center; and a cover covering the core, wherein, at least one piece or one layer of said intermediate layers is formed from a highly elastic intermediate layer composition that contains (A) a highly elastic polyamide resin having a flexural modulus in a range from 700 MPa to 5,000 MPa and (B) a metal-neutralized product of ethylene-(meth)acrylic acid copolymer in an amount ratio ((A)/(B)) of (A) the highly elastic polyamide resin to (B) the metal-neutralized product of ethylene-(meth)acrylic acid copolymer being (20 mass % to 80 mass %)/(80 mass % to 20 mass %) (the total is 100 mass %), and (C) a resin having a polar functional group in an amount of 0.1 part by mass to 30 parts by mass with respect to 100 parts by mass of the sum of (A) the highly elastic polyamide resin and (B) the metal-neutralized product of ethylene-(meth)acrylic acid copolymer.

(1) Composition and Properties (1-1) (A) Highly Elastic Polyamide Resin

First, (A) the highly elastic polyamide resin having a flexural modulus in a range from 700 MPa to 5,000 MPa will be described.

(A) The highly elastic polyamide resin is not limited, as long as it is a polyamide resin or a polyamide elastomer comprising a polyamide and having a flexural modulus in a range from 700 MPa to 5,000 MPa. Herein, "polyamide" is defined as a polymer having plurality of amide bonds (—NH—CO—) in a main molecular chain.

Examples of the polyamide contained in (A) the highly elastic polyamide resin are, an aliphatic polyamide such as polyamide 6, polyamide 11, polyamide 12, polyamide 66, polyamide 610, polyamide 6T, polyamide 6I, polyamide 9T, polyamide MST, polyamide 612; an aromatic polyamide such as poly-p-phenyleneterephthalamide, poly-m-phenyleneisophthalamide; an amide copolymer such as a polyetherblock amide copolymer, a polyester amide copolymer, a polyether-ester amide copolymer, a polyamideimide copolymer. These polyamides may be used individually or in combination of at least two of them. Among them, the aliphatic polyamide such as polyamide 6, polyamide 11, polyamide 12 is preferable.

The flexural modulus of (A) the highly elastic polyamide resin is 700 MPa or more, preferably 750 MPa or more, and more preferably 800 MPa or more. If the flexural modulus of (A) the highly elastic polyamide resin is less than 700 MPa, the rigidity of the intermediate layer is insufficient, and hence the effect of reducing the spin rate is not obtained. Further, the flexural modulus of (A) the highly elastic polyamide resin is 5,000 MPa or less, preferably 4,500 MPa or less, and more preferably 4,000 MPa or less. If the flexural modulus of (A) the highly elastic polyamide resin exceeds 5,000 MPa, the rigidity of the intermediate layer is excessively enhanced, and hence the shot feeling and the durability deteriorate. In the present invention, the flexural modulus is a value measured according to ISO 178, and the method for measuring the flexural modulus is described later.

The brittle temperature of the highly elastic polyamide resin is preferably −20° C. or less, more preferably −30° C. or less, even more preferably −50° C. or less. If the brittle temperature of the highly elastic polyamide resin (A) is −20° C. or less, the low temperature durability of the intermediate layer which is formed from the highly elastic intermediate layer composition is further improved, and thus the low temperature durability of the resultant golf ball is further improved. In the present invention, the brittle temperature of the highly elastic polyamide resin is a value measured according to JIS K7216.

Specific examples of the highly elastic polyamide resin (A) include "Novamid (registered trademark) ST220, Novamid 1010C2, Novamid ST145" available from Mitsubishi Engineering-Plastics Company, "Pebax (registered trademark) 4033SA, Pebax 7233SA" available from Arkema Inc., "UBE Nylon (registered trademark) 10181, UBE Nylon 1030J", "UBESTA (registered trademark) P3014U, UBESTA3035JU6, UBESTA PAE1200U2" available from UBE INDUSTRIES, LTD, "Zytel (registered trademark) FN716, Zytel ST811HS" available from E.I. du Pont de Nemours and Company, "Amilan (registered trademark) U441, Amilan U328, Amilan U141" available from Toray Industries Inc., "Leona (registered trademark) 1300S" available from Asahi Kasei Corporation.

The content of (A) the highly elastic polyamide resin in the resin component contained in the highly elastic intermediate layer composition is preferably 16 mass % or more, more preferably 20 mass % or more, and even more preferably 25 mass % or more, and is preferably 78 mass % or less, more preferably 75 mass % or less, and even more preferably 70 mass % or less. If the content of (A) the highly elastic polyamide resin in the resin component contained in the highly elastic intermediate layer composition is less than 16 mass %, the flexural modulus of the intermediate layer may become low, and the effect of the high launch angle and low spin rate becomes small. On the other hand, if the content of (A) the highly elastic polyamide resin in the resin component contained in the highly elastic intermediate layer composition is more than 78 mass %, the flexural modulus of the intermediate layer is excessively increased. Thus, the durability and shot feeling of the resultant golf ball may be lowered.

(1-2) Metal-Neutralized Product of (B) Ethylene-(Meth) Acrylic Acid Copolymer

Next, the metal-neutralized product of (B) the ethylene-(meth)acrylic acid copolymer (hereinafter, referred to as "(B) metal-neutralized copolymer") will be described. The metal-neutralized copolymer contributes the repulsive performance of the golf ball in addition to the fluidity of the resin composition for the intermediate layer.

(B) The metal-neutralized copolymer is a copolymer obtained by copolymerizing a monomer composition containing ethylene and (meth)acrylic acid and a metal-ion neutralized product obtained by neutralizing at least a part of carboxyl groups in the copolymer with a metal ion.

The content of the (meth)acrylic acid component in the ethylene-(meth)acrylic acid copolymer constituting (B) the metal-ion neutralized copolymer is preferably 2 mass % or more, more preferably 3 mass % or more, and is preferably 30 mass % or less, more preferably 25 mass % or less.

The ethylene-(meth)acrylic acid copolymer constituting (B) the metal-neutralized copolymer may be a multi-component copolymer obtained by copolymerizing another monomer than ethylene and (meth)acrylic acid. Examples of another monomer which can be used for the multi-component copolymer are a vinyl ester such as vinyl acetate, vinyl propionate; an unsaturated carboxylate such as methyl (meth)acrylate, ethyl (meth)acrylate, isopropyl (meth)acrylate, isobutyl (meth)acrylate, n-butyl (meth)acrylate, isooctyl (meth)acrylate, 2-ethylhexyl (meth)acrylate, dimethyl maleate, diethyl maleate.

In the case that another monomer is used, the content of another monomer in the copolymer is preferably 40 mass % or less, more preferably 30 mass % or less, even more preferably 20 mass % or less.

Examples of a metal (ion) used for neutralization for the metal neutralized copolymer (B) include: monovalent metals (ions), such as sodium, potassium, lithium, and the like; divalent metals (ions), such as magnesium, calcium, zinc, barium, cadmium, and the like; trivalent metals (ions), such as aluminum and the like; and other metals (ions), such as tin, zirconium, and the like. Among these metals (ions), sodium, zinc and magnesium (ions) are preferably used because they provide excellent resilience, durability, or the like.

The degree of neutralization of the acidic groups contained in (B) the metal neutralized copolymer is preferably 20 mole % or more, more preferably 30 mole % or more, and is preferably 100 mole % or less, more preferably 90 mole % or less, even more preferably 85 mole % or less. The degree of neutralization of the acidic groups in the metal neutralized copolymer (B) can be calculated by using the following mathematical expression 1.

$$\text{Degree of neutralization(mol \%)} = (\text{the number of moles of acidic groups neutralized in a metal neutralized copolymer/the number of moles of all acidic groups contained in the metal neutralized copolymer}) \times 100 \quad [\text{Mathematical Expression 1}]$$

The flexural modulus of (B) the metal neutralized copolymer is 250 MPa or more, preferably 260 MPa or more, and more preferably 270 MPa or more, and is 1,000 MPa or less, preferably 800 MPa or less, and more preferably 600 MPa or less. If the flexural modulus of (B) the metal neutralized copolymer is too low, the elastic modulus of the intermediate layer becomes low, and the effects of increasing the launch angle and reducing the spin rate are decreased. On the other hand, if the flexural modulus of (B) the metal neutralized copolymer is too high, the elastic modulus of the intermediate layer becomes excessively high, and the durability and the shot feeling of the golf ball deteriorate. Specific examples of the ionomer resin (B) include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7317, Himilan AM 7318, Himilan AM7329 (Zn), Himilan 1856 (Na), Himilan 1855 (Zn), Himilan MK7320 and the like)" commercially available from Du Pont-Mitsui Polychemicals Co., Ltd.

Further, ionomer resins commercially available from E.I. du Pont de Nemours and Company include trade name "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li), Surlyn 6320 (Mg), Surlyn 8120 (Na), Surlyn 8320 (Na), Surlyn 9320 (Zn), Surlyn 9320W (Zn), Surlyn 8940 (Na), Surlyn 9910 (Zn) and the like)", "HPF 1000 (Mg), HPF 2000 (Mg)", and the like.

Further, ionomer resins commercially available from ExxonMobil Chemical Corporation include trade name "Iotek (registered trademark) (e.g. Iotek 8000 (Na), Iotek 8030 (Na), Iotek 7010 (Zn), Iotek 7030 (Zn), and the like)". Examples of a ternary copolymerized ionomer are "Iotek 7510 (Zn), Iotek 7520 (Zn)" and the like.

It is noted that Na, Zn, Li, and Mg described in the parentheses after the trade names indicate metal types of neutralizing metal ions for the metal neutralized copolymer.

The content of (B) the metal neutralized copolymer in the resin component constituting the highly elastic intermediate layer composition is preferably 16 mass % or more, more preferably 20 mass % or more, even more preferably 25 mass % or more, and is preferably 78 mass % or less, more preferably 75 mass % or less, and even more preferably 70 mass % or less. If the content of the metal neutralized copolymer (B) in the resin component constituting the highly elastic intermediate layer composition is less than 16 mass %, the repulsive performance and the durability of the golf ball may deteriorate. On the other hand, if the content is more than 78 mass %, the elastic modulus of the intermediate layer cannot be made in an appropriate range, and hence the effects of increasing the launch angle and reducing the spin rate may not be obtained.

(1-3) Resin Having a Polar Functional Group

Next, (C) a resin having a polar functional group will be explained.

(C) The resin having a polar functional group is not limited, as long as it is a polymer into which a functional group is incorporated, for example, a resin obtained by copolymerizing a monomer having a polar functional group and a monomer not having a polar functional group. Herein, the polar functional group is a functional group having a polarity and becomes a factor that allows a resin to bear polarity, and examples include an epoxy group, a hydroxyl group, an amino group, a nitro group, a carboxyl group, a formyl group, a nitrile group, a sulfonic acid group, and the like. Among them, the epoxy group, and the carboxyl group are preferable.

Because the main backbone of (C) the resin having a functional group has a low polarity, the main backbone is highly compatible with the highly elastic polyamide resin (A). Because the functional group introduced in (C) the resin has a high polarity, the functional group (side chain portion) is highly compatible with (B) the metal neutralized copolymer. Thus, by causing the highly elastic intermediate layer composition to contain (C) the resin having a polar functional group, the dispersibility of (A) the highly elastic polyamide resin and (B) the metal neutralized copolymer can be improved, and hence the durability of the golf ball can be further improved.

Examples of the monomer having a polar functional group include, but are not limited to, epoxy group-containing monomers such as glycidyl (meth)acrylate, 2-vinyloxirane, (allyloxy)oxirane, and the like; hydroxyl group-containing monomers such as 2-hydroxyethyl (meth)acrylate, 2-hydroxypropyl (meth)acrylate, vinyl alcohol, allyl alcohol, 2-hydroxyethyl vinyl ether, and the like; sulfonic group-containing monomers such as vinyl sulfonic acid and the like; and carboxyl group-containing monomers such as (meth)acrylic acid, itaconic acid, maleic anhydride, and the like. These monomers having polar functional groups may be used solely or in combination of two or more thereof. Among them, as the monomer having a polar functional group, epoxy group-containing monomers are preferable, and in particular, glycidyl (meth)acrylate is more preferable. An epoxy group can further improve the interface strength between (A) the highly elastic polyamide resin and (B) the metal neutralized copolymer because it has reactivity with the carboxyl group contained in (B) the metal neutralized copolymer.

Examples of the monomer not having a polar functional group include, but are not limited to, olefins such as ethylene, propylene, 1-butene, isobutene, 1-pentene, and the like; and alkyl (meth)acrylates such as methyl (meth)acrylate, ethyl (meth)acrylate, propyl (meth)acrylate, n-butyl (meth)acrylate, isobutyl (meth)acrylate, and the like. These monomers not having polar functional groups may be used solely or in combination of two or more types thereof. Among them, as the monomer not having a polar functional group, ethylene and methyl (meth) acrylate are preferable.

The content of the monomer component having a polar functional group contained in (C) the resin having a polar functional group is preferably 0.1 mass % or more, more preferably 0.5 mass % or more, and even more preferably 1 mass % or more, and is preferably 30 mass % or less, more preferably 25 mass % or less, even more preferably 20 mass % or less. By causing the content of the monomer component having a polar functional group in (C) the resin having a polar functional group to be in the above range, the dispersibility of (A) the highly elastic polyamide resin and (B) the metal neutralized copolymer can be sufficiently enhanced.

Examples of (C) the resin having a polar functional group include a (meth)acrylic acid ester-glycidyl (meth)acrylate copolymer, an epoxy group-containing (meth)acrylic-based polymer, an ethylene-glycidyl (meth)acrylate copolymer, an ethylene-(meth)acrylic acid copolymer, an ethylene-(meth) acrylic acid-(meth)acrylic acid ester copolymer, an ethylene-(meth)acrylic acid ester-glycidyl (meth)acrylate copolymer, a maleic acid modified styrene-ethylene-butylene-styrene block polymer (SEBS), a maleic acid modified styrene-ethylene-butylene-olefin crystalline block polymer (SEBC), maleic acid modified polyethylene (PE), maleic acid modified polypropylene (PP), maleic acid modified ethylene-vinyl acetate copolymer (EVA), a maleic acid modified ethylene-propylene-diene rubber (EPDM), an epoxy group-containing styrene-based polymer, and the like. These resins (C) having polar functional groups may be used solely or in combination of two or more types thereof. Among them, an ethylene-glycidyl (meth)acrylate copolymer, an ethylene-(meth) acrylic acid ester-glycidyl (meth)acrylate copolymer, and a methyl methacrylate-glycidyl methacrylate copolymer are preferable, and in particular, an ethylene-glycidyl methacrylate copolymer and the mixture of an ethylene-glycidyl methacrylate copolymer and another resin (C) having a polar functional group are preferable.

Specific examples of (C) the resin having a polar functional group include "LOTARDER AX8840" manufactured by Arkema Inc., "ARUFON (registered trademark) UG-4030" manufactured by Toagosei Co., Ltd., "Bond Fast (registered trademark) E" manufactured by Sumitomo Chemical Co., Ltd., "Tuftec (registered trademark) M1913 and Tuftec M1943" manufactured by Asahi Kasei Corporation, "FUSA-BOND (registered trademark) NM052D" manufactured by E.I. du Pont de Nemours and Company, "Dynaron (registered trademark) 4630P" manufactured by JSR Corporation, "NUCREL (registered trademark) (e.g. NUCREL AN4214C, NUCREL AN4225C, NUCREL AN42115C, NUCREL N0903HC, NUCREL N0908C, NUCREL AN42012C, NUCREL N410, NUCREL N1035, NUCREL N1050H, NUCREL N1108C, NUCREL N1110H, NUCREL N1207C, NUCREL N1214, NUCREL AN4221C, NUCREL N1525, NUCREL N1560, NUCREL N0200H, NUCREL AN4228C, NUCREL N4213C, NUCREL N035C, and the like) manufactured by Du Pont-Mitsui Polychemicals Co., Ltd., and the like.

The content ratio ((A)/(B)) of (A) the highly elastic polyamide resin to (B) the metal neutralized copolymer (the total is 100 mass %) in the highly elastic intermediate layer composition is preferably (20 mass % to 80 mass %)/(80 mass % to 20 mass %). By causing the content ratio of (A) the highly elastic polyamide resin to (B) the metal neutralized copolymer to be in the above range, the intermediate layer has a desired elastic modulus, and the launch angle is increased and the spin rate is reduced, thereby improving the flight distance of the golf ball. The content ratio ((A)/(B)) of (A) the highly elastic polyamide resin to (B) the metal neutralized copolymer (the total is 100 mass %) in the highly elastic intermediate layer composition is more preferably (25 mass % to 75 mass %)/(75 mass % to 25 mass %) and even more preferably (30 mass % to 70 mass %)/(70 mass % to 30 mass %).

The highly elastic intermediate layer composition preferably contains (C) the resin having a polar functional group in an amount of 20 parts by mass or less with respect to 100 parts by mass of the sum of (A) the highly elastic polyamide resin and (B) the metal neutralized copolymer. If the content of (C) the resin having a polar functional group is more than 20 parts by mass, the fluidity of the highly elastic intermediate layer composition may deteriorate and the moldability may not be maintained. The content of (C) the resin having a polar functional group is preferably 15 parts or less, more preferably 10 parts or less by mass. On the other hand, the highly elastic intermediate layer composition preferably contains (C) the resin having a polar functional group in an amount of 0.1 part by mass or more with respect to 100 parts by mass of the sum of (A) the highly elastic polyamide resin and (B) the metal neutralized copolymer. If the content of (C) the resin having a polar functional group is less than 0.1 part by mass, the improved effect of the mutual dispersibility between (A) the highly elastic polyamide resin and (B) the metal neutralized copolymer may not be obtained. The content of (C) the resin having a polar functional group is preferably 2 parts by mass or more.

The highly elastic intermediate layer composition may contain another resin component in addition to (A) the highly elastic polyamide resin, (B) the metal neutralized copolymer, and (C) the resin having a polar functional group, as long as another resin component does not impair the effects of the present invention. However, it is preferred that the resin component in the highly elastic intermediate layer composition consists of (A) the highly elastic polyamide resin, (B) the metal neutralized copolymer, and (C) the resin having a polar functional group. Further, a specific gravity adjusting agent such as barium sulfate, tungsten and the like, an antioxidant, a pigment, and the like may be blended in the highly elastic intermediate layer composition, as long as they do not impair the effects of the present invention.

(1-4) Center Composition

The center used for the golf ball of the present invention will be explained.

As the center of the golf ball of the present invention, a conventionally known rubber composition (hereinafter simply referred to as "center rubber composition" occasionally) may be employed, and it can be molded by, for example, heat-pressing a rubber composition containing a base rubber, a crosslinking initiator, a co-crosslinking agent, and a filler.

As the base rubber, a natural rubber and/or a synthetic rubber may be used. Examples of the base rubber are a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4-bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butyl peroxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.3 part by mass or more, more preferably 0.4 part by mass or more, and is preferably 5 parts by mass or less, more preferably 3 parts by mass or less based on 100 parts by mass of the base rubber. If the amount is less than 0.3 part by mass, the core becomes too soft, and the repulsion tends to be lowered, and if the amount is more than 5 parts by mass, the amount of the co-crosslinking agent must be increased in order to obtain the appropriate hardness, which tends to cause the insufficient repulsion.

The co-crosslinking agent is not particularly limited as long as it has the effect of crosslinking a rubber molecule by graft polymerization with a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high repulsion.

The amount of the co-crosslinking agent to be used is preferably 10 parts or more, more preferably 15 parts or more, even more preferably 20 parts or more, and is preferably 55 parts or less, more preferably 50 parts or less, even more preferably 48 parts or less based on 100 parts of the base rubber by mass. If the amount of the co-crosslinking agent to be used is less than 10 parts by mass, the amount of the crosslinking initiator must be increased to obtain an appropriate hardness, which tends to lower the repulsion. On the other hand, if the amount of the co-crosslinking agent to be used is more than 55 parts by mass, the core becomes too hard, so that the shot feeling may be lowered.

The filler contained in the center rubber composition is mainly blended as a specific gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 0.5 part or more, more preferably 1 part or more, and preferably 30 parts or less, more preferably 20 parts or less based on 100 parts of the base rubber by mass. If the amount of the filler to be blended is less than 0.5 parts by mass, it becomes difficult to adjust the weight, while if it is more than 30 parts by mass, the weight ratio of the rubber component becomes small and the repulsion tends to be lowered.

As the center rubber composition, an organic sulfur compound, an antioxidant or a peptizing agent may be blended appropriately in addition to the base rubber, the crosslinking initiator, the co-crosslinking agent and the filler.

As the organic sulfur compound, a diphenyl disulfide or a derivative thereof may be preferably used. Examples of the diphenyl disulfide or the derivative thereof include diphenyl disulfide, a mono-substituted diphenyl disulfide such as bis(4-chlorophenyl) disulfide, bis(3-chlorophenyl) disulfide, bis(4-bromophenyl) disulfide, bis(3-bromophenyl) disulfide, bis(4-fluorophenyl) disulfide, bis(4-iodophenyl) disulfide and bis(4-cyanophenyl) disulfide; a di-substituted diphenyl disulfide such as bis(2,5-dichlorophenyl) disulfide, bis(3,5-dichlorophenyl) disulfide, bis(2,6-dichlorophenyl) disulfide, bis(2,5-dibromophenyl) disulfide, bis (3,5-dibromophenyl) disulfide, bis(2-chloro-5-bromophenyl) disulfide, and bis(2-cyano-5-bromophenyl) disulfide; a tri-substituted diphenyl disulfide such as bis (2,4,6-trichlorophenyl) disulfide, and bis(2-cyano-4-chloro-6-bromophenyl) disulfide; a tetra-substituted diphenyl disulfide such as bis(2,3,5,6-tetra chlorophenyl) disulfide; a penta-substituted diphenyl disulfide such as bis (2,3,4,5,6-pentachlorophenyl) disulfide and bis(2,3,4,5,6-pentabromophenyl) disulfide. These diphenyl disulfides or the derivative thereof can enhance resilience by having some influence on the state of vulcanization of vulcanized rubber. Among them, diphenyl disulfide and bis(pentabromophenyl) disulfide are preferably used since a golf ball having particularly high resilience can be obtained. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

(1-5) Cover Composition

The following will describe the cover of the golf ball of the present invention. Examples of the resin component of the cover composition for forming the cover include, in addition to a polyurethane resin and a known ionomer resin, a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polystyrene elastomer having a trade name "Rabalon (registered trademark)" commercially available from Mitsubishi Chemical Corporation, and the like. These resin components may be used solely or in combination of two or more types thereof. Among them, a polyurethane resin is preferable.

The polyurethane resin is soft. If the polyurethane resin is used for the cover of the golf ball, the spin rate when struck with an iron becomes high. Thus, the cover comprising the polyurethane resin contributes the control on the shots with short irons. The polyurethane resin also contributes the abrasion resistance of the cover.

The cover composition for forming the cover of the golf ball of the present invention contains a polyurethane resin as the resin component in an amount of preferably 50 mass % or more, more preferably 60 mass % or more, and even more preferably 70 mass % or more. In a more preferable embodiment, the resin component in the cover composition consists of the polyurethane resin.

The polyurethane resin is not particularly limited, as long as it has a plurality of urethane bonds within the molecule. For example, the polyurethane resin can be obtained by reacting a polyisocyanate component with a high-molecular-weight polyol component to have urethane bonds formed within the molecule. Further, a chain extension reaction with a low-molecular-weight polyol, a low-molecular-weight polyamine, or the like is performed if necessary.

As the polyurethane resin, thermoplastic polyurethane or thermosetting polyurethane can be used. In view of the productivity, the thermoplastic polyurethane is preferable. The thermoplastic polyurethane contains a polyurethane component as a hard segment and a polyester component or a polyether component as a soft segment. As a curing agent for the polyurethane component, an alicyclic diisocyanate, an aromatic diisocyanate, and an aliphatic diisocyanate are exemplified. Especially, the alicyclic diisocyanate is preferable. Since the alicyclic diisocyanate does not have a double bond in a main molecular chain, yellowing of the cover is suppressed. Two or more diisocyanates may be used together.

Examples of the alicyclic diisocyanates are 4,4'-dicyclohexylmethane diisocyanate ($H_{12}MDI$), 1,3-bis(isocyanatemethyl)cyclohexane ($H_6XDI$), isophorone diisocyanate(IPDI), and trans-1,4-cyclohexanediisocyanate (CHDI). In view of the versatility and processability, $H_{12}MDI$ is preferable.

Examples of the aromatic diisocyanate are 4,4'-diphenylmethane diisocyanate(MDI) and toluene diisocyanate (TDI). As the aliphatic diisocyanate, hexamethylene diisocyanate (HDI) is exemplified.

Specific example of the thermoplastic polyurethane includes "Elastollan XNY80A," "Elastollan XNY85A," "Elastollan XNY90A," "Elastollan XNY97A," "Elastollan XNY585," "Elastollan XKP016N" available from BASF Japan Ltd, "Resamine P4585LS," "ResaminePS62490" available from Dainichiseika Color & Chemicals Mfg. Co., Ltd.

The cover may be formed from a composition containing the thermoplastic polyurethane and polyisocyanate compound. During or after molding the cover, the polyurethane is crosslinked with the polyisocyanate compound.

The slab hardness in Shore D hardness of the polyurethane resin is preferably 10 or more, more preferably 20 or more, and even more preferably 30 or more, and is preferably 65 or less, more preferably 60 or less, and even more preferably 55 or less. If the hardness of the polyurethane resin is excessively low, the spin rate upon a shot with a driver may increase. Further, if the hardness of the polyurethane resin is excessively high, the spin rate upon a shot with an approach wedge may become excessively low.

In the present invention, in addition to the aforementioned resin component, the cover may contain a pigment component such as a white pigment (titanium oxide), a blue pigment, a red pigment, and the like, a specific gravity adjusting agent such as zinc oxide, calcium carbonate, barium sulfate, and the like, a dispersant, an antioxidant, an ultraviolet absorber, a light stabilizer, a fluorescent material or a fluorescent brightener and the like, as long as they do not impair the performance of the cover.

The amount of the white pigment (titanium oxide), with respect to 100 parts by mass of the resin component constituting the cover, is preferably 0.5 part by mass or more and more preferably 1 part by mass or more, and is preferably 10 parts by mass or less and more preferably 8 parts by mass or less. By causing the amount of the white pigment to be 0.5 parts by mass or more, it is possible to provide opacity to the cover. If the amount of the white pigment is more than 10 parts by mass, there is the possibility that the durability of the resultant cover will deteriorate.

The slab hardness in Shore D hardness of the cover composition is preferably 60 or less, more preferably 53 or less, and even more preferably 48 or less. By causing the slab hardness of the cover composition to be 60 or less, the spin stability upon an approach shot with a short iron or the like is enhanced. As a result, a golf ball with excellent controllability upon an approach shot is obtained. In order to ensure a sufficient spin rate upon an approach shot, the slab hardness in Shore D hardness of the cover composition is preferably 20 or more, more preferably 27 or more, and even more preferably 32 or more.

(2) Structure of Golf Ball

The golf ball of the present invention comprises a core consisting of a center and at least one intermediate layer covering the center and a cover covering the core.

(2-1) Center Structure

The center preferably has a diameter of 5 mm or more, more preferably 15 mm or more, more preferably 25 mm or more, and preferably has a diameter of 41 mm or less, more preferably 40 mm or less, even more preferably 35 mm or less. If the diameter is less than 5 mm, the thickness of the intermediate layer or the cover needs to be greater than a desired thickness, and hence the repulsion may deteriorate. On the other hand, if the diameter of the center exceeds 41 mm, the thickness of the intermediate layer or the cover needs to be smaller than the desired thickness, and hence the intermediate layer or the cover may not function well.

When the center has a diameter in a range from 5 mm to 41 mm, a compression deformation amount of the center (an compression amount of the center in the compression direction thereof) when applying an initial load of 98 N to a final load of 1275 N is preferably 2.0 mm or more, more preferably 4.0 mm or more, and is preferably 10.0 mm or less and more preferably 5.0 mm or less. If the compression deformation amount is less than 2.0 mm, the shot feeling may become hard and deteriorate. If the compression deformation amount exceeds 10.0 mm, the repulsion may deteriorate.

The surface hardness in Shore D hardness of the center is preferably 35 or more, more preferably 40 or more, and even more preferably 54 or more, and is preferably 75 or less, more preferably 67 or less, and even more preferably 64 or less. If the surface hardness in Shore D hardness of the center is less than 35, the golf ball becomes excessively soft and the repulsion may deteriorate, thereby decreasing the flight distance. On the other hand, if the surface hardness in Shore D hardness of the center is more than 75, the golf ball becomes excessively hard and the shot feeling may deteriorate.

(2-2) Core Structure

The core of the golf ball of the present invention includes, for example, a core consisting of a center and a single-layered intermediate layer covering the center, a core consisting of a center and multi-piece or multi-layer of intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs. For example, the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

When the center is covered with a single-layer intermediate layer or multi-layer of intermediate layers as the intermediate layer, at least one layer of the intermediate layer is formed from the highly elastic intermediate layer composition. When the depressed portion divided by the ribs provided on the surface of the center are preferably filled with a plurality of intermediate layers, at least one of the plurality of intermediate layers is formed from the highly elastic intermediate layer composition. It is noted that when the core includes a center and multi-piece of intermediate layers or multi-layer of intermediate layers covering the center, the core may include an intermediate layer which is formed from an intermediate layer composition different from the highly elastic intermediate layer composition, as long as it does not impair the effects of the present invention. In this case, it is preferred that the outermost layer of the core is an intermediate layer formed from the highly elastic intermediate layer composition, and it is much preferred that all the multi-piece of intermediate layers or multi-layer of intermediate layers are formed from the highly elastic intermediate layer composition.

Examples of the intermediate layer composition which is different from the highly elastic intermediate layer composition includes, in addition to a later-described rubber composition for the center and the ionomer resin, a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A")" commercially available from BASF Japan Ltd., a thermoplastic polystyrene elastomer having a trade name "Rabalon (registered trademark)" commercially available from Mitsubishi Chemical Corporation, and the like. In addition, the intermediate layer composition may contain a specific gravity adjusting agent such as barium sulfate, tungsten, and the like, an antioxidant, a pigment, and the like.

The thickness of the intermediate layer formed from the highly elastic intermediate layer composition is preferably 3.0 mm or less, more preferably 2.5 mm or less, and even more preferably 2.0 mm or less, and is preferably 0.1 mm or more, more preferably 0.5 mm or more, and even more preferably 0.8 mm or less. If the thickness of the intermediate layer formed from the highly elastic intermediate layer composition is less than 0.1 mm, the durability of the golf ball may be lowered, while if the thickness is more than 3.0 mm, the repulsion of the golf ball deteriorate and the shot feeling may get worse.

The slab hardness in Shore D hardness of the highly elastic intermediate layer composition is preferably 65 or more, more preferably 66 or more, and even more preferably 67 or more, and is preferably 75 or less, more preferably 73 or less, and even more preferably 71 or less. If the slab hardness in Shore D hardness of the highly elastic intermediate layer composition is less than 65, the hardness of the resultant intermediate layer decreases, and hence the effects of increasing the launch angle and reducing the spin rate may not be obtained. Further, if the slab hardness in Shore D hardness of the highly elastic intermediate layer composition is more than 75, the intermediate layer becomes excessively hard, and hence the durability of the golf ball may deteriorate.

The flexural modulus of the highly elastic intermediate layer composition is preferably 300 MPa or more, more preferably 320 MPa or more, and even more preferably 350 MPa or more, and is preferably 1,000 MPa or less, more preferably 900 MPa or less, and even more preferably 800 MPa or less. If the flexural modulus of the highly elastic intermediate layer composition is less than 300 MPa, the effects of increasing the launch angle and reducing the spin rate may not be obtained, while if the flexural modulus of the highly elastic intermediate layer composition is more than 1,000 MPa, the moldability of the highly elastic intermediate layer composition may deteriorate, and the durability of the golf ball may also deteriorate.

The tensile modulus of the highly elastic intermediate layer composition is preferably 400 MPa or more, more preferably 410 MPa or more, and even more preferably 420 MPa or more, and is preferably 1,500 MPa or less, more preferably 1,400 MPa or less, and even more preferably 1,300 MPa or less. If the tensile modulus of the highly elastic intermediate layer composition is less than 400 MPa, the effects of high launch angle and low spin rate may not be obtained. On the other hand, if the tensile modulus of the highly elastic intermediate layer composition is more than 1,500 MPa, the durability of the golf ball may deteriorate.

Herein, the slab hardness, the flexural modulus, and the tensile modulus of the highly elastic intermediate layer composition are measured by later-described measuring methods.

It is noted that the slab hardness, the flexural modulus, and the tensile modulus of the highly elastic intermediate layer composition can be adjusted, for example, by appropriately deciding the combination of the highly elastic polyamide resin (A), the metal neutralized copolymer (B), and the resin (C) having a polar functional group, and appropriately deciding the amount of an additive.

The diameter of the core of the golf ball of the present invention is preferably 30 mm or more, more preferably 35 mm or more, and even more preferably 37 mm or more. If the diameter of the core is less than 30 mm, the cover becomes excessively thick and hence the repulsion of the golf ball may deteriorate. Further, the diameter of the core is preferably 41.5 mm or less, more preferably 41.25 mm or less, and even more preferably 41.0 mm or less. If the diameter of the core is more than 41.5 mm, the thickness of the cover becomes relatively thin, and hence a protection effect of the cover is not obtained sufficiently.

It is preferable that the core of the present invention has a larger surface hardness than the center hardness. The hardness difference (surface hardness-center hardness) between the surface hardness and the center hardness of the core in the golf ball of the present invention is preferably 10 or larger, more preferably 15 or larger in Shore D hardness. Making the surface hardness of the core larger than the center hardness increases the launch angle and reduces the amount of spin, thereby improving the flight distance of the golf ball. The hardness difference (surface hardness-center hardness) between the surface hardness and the center hardness of the core is, without limitation, preferably 55 or less, more preferably 50 or less in Shore D. If the hardness difference is too large, the durability of the golf ball tends to be lower.

The center hardness of the core is preferably 20 or larger, more preferably 27 or larger, and even more preferably 32 or larger in Shore D hardness. If the center hardness is 20 or larger in Shore D hardness, the core does not become too soft, resulting in the good repulsion. The center hardness of the core is preferably 60 or smaller, more preferably 53 or smaller, and even more preferably 48 or smaller in Shore D. If the center hardness is 60 or less in Shore D hardness, the core does not become too hard, resulting in the good shot feeling. In the present invention, the center hardness of the core is the hardness measured with the Shore D type spring hardness tester at the central point of a cut plane of a core which has been cut into two halves.

The surface hardness of the core is preferably 40 or larger, more preferably 48 or larger, and even more preferably 54 or larger in Shore D hardness. If the surface hardness is 40 or larger, the core does not become too soft, and the good repulsion would be obtained. The surface hardness of the core is preferably 80 or smaller, more preferably 75 or smaller, and even more preferably 70 or smaller in shore D hardness. If the surface hardness is 80 or less in Shore D hardness, the core does not become too hard, and the good shot feeling would be provided.

In the present invention, the thickness of the cover of the golf ball is preferably 3 mm or less, more preferably 2.5 mm or less, and even more preferably 2 mm or less. This is because by causing the thickness of the cover to be 3 mm or less, desirable repulsion and shot feeling are obtained. The thickness of the cover is preferably 0.1 mm or more, more preferably 0.2 mm or more, and even more preferably 0.3 mm or more. This is because if the thickness of the cover is less than 0.1 mm, there is the possibility that it becomes difficult to mold the cover. In addition, the durability and the abrasion resistance of the cover may deteriorate.

When the golf ball of the present invention has a diameter in a range from 40 mm to 45 mm, a compression deformation amount of the golf ball (an amount of compression of the golf ball in the compression direction thereof) when applying an initial load of 98 N to a final load of 1275 N to the golf ball is preferably 2.0 mm or more, more preferably 2.1 mm or more, and even more preferably 2.2 mm or more, and is preferably 3.0 mm or less, more preferably 2.9 mm or less, and even more preferably 2.8 mm or less. By causing the compression deformation amount to be 2.0 mm or more, desirable shot feeling is obtained. By causing the compression deformation amount to be 3.0 mm or less, desirable repulsion is obtained.

The golf ball of the present invention can have various structures, as long as it comprises: a core consisting of a center and one or more intermediate layers covering the center; and a cover covering the core. Specific examples of the golf ball of the present invention include a three-piece golf ball comprising a core consisting of a center and an intermediate layer covering the center, and a cover covering the core; a four-piece golf ball comprising a core consisting of a center and two intermediate layers covering the center, and a cover covering the core; and a multi-piece golf ball comprising a core consisting of a center and multi-piece of intermediate layers or multi-layer of intermediate layers covering the center, and a cover covering the core. Among them, the present invention is suitably applicable to a three-piece golf ball comprising a core consisting of a center and a single-layer intermediate layer covering the center, and a cover covering the core, and a four-piece golf ball comprising a core consisting of a center and two intermediate layers covering the center, and a cover covering the core.

Preferable embodiments of the present invention are a three-piece golf ball, which comprises: a core consisting of a center and a single-layer intermediate layer covering the center; and a cover covering the core, wherein the intermediate layer is formed from the highly elastic intermediate layer composition, and a golf ball, which comprises: a core consisting of a center and two intermediate layers covering the center; and a cover covering the core, wherein an outside intermediate layer is formed from the highly elastic intermediate layer composition. Herein, the embodiment where the golf ball comprises a core consisting of a center and two intermediate layers covering the center and a cover covering the core, wherein an outside intermediate layer is formed from the highly elastic intermediate layer composition can be rephrased into an embodiment where a golf ball comprises an outer core consisting of a center and one or more intermediate layers covering the center; and a cover covering the outer core, wherein the outer core consists of an inner core having the center and a surrounding layer disposed outside the center, and the intermediate layer is formed from the highly elastic intermediate layer composition.

(3) Multi-Piece Structure

Namely, in one preferable embodiment, the golf ball of the present invention comprises an outer core consisting of a center and one or more intermediate layers covering the center; and a cover covering the outer core, wherein the outer core consists of an inner core having the center and a surrounding layer disposed outside the center; and the intermediate layer disposed outside the inner core, and the inner core has a surface hardness H4 which is equal to or less than the surface hardness H6 of the outer core, and the cover has a hardness H7 of 50 or less in Shore D hardness, wherein the intermediate layer is formed from a highly elastic intermediate layer composition that contains (A) a highly elastic polyamide resin having a flexural modulus in a range from 700 MPa to 5,000 MPa and (B) a metal-neutralized product of ethylene-(meth)acrylic acid copolymer in an amount ratio ((A)/(B)) of (A) the highly elastic polyamide resin to (B) the metal-neutralized product of ethylene-(meth) acrylic acid being (20 mass % to 80 mass %)/(80 mass % to 20 mass %) (the total is 100 mass %), and (C) a resin having a polar functional group in an amount of 0.1 part by mass to 30 parts by mass with respect to 100 parts by mass of the sum of (A) the highly elastic polyamide resin and (B) the metal-neutralized product of ethylene-(meth)acrylic acid copolymer.

The intermediate layer comprising (A) the highly elastic polyamide resin having a flexural modulus in a range from 700 MPa to 5,000 MPa is very rigid. In the above golf ball, the spherical outer core which consists of the center, the surrounding layer and the intermediate layer has a structure getting harder from inside to outside (hereinafter, referred to as "outer-hard inner-soft structure" occasionally). This golf ball is launched with the high angle and the low spin rate upon a driver shot. The polyamide resin (A) also contributes the low temperature durability of the golf ball. The metal neutralized ethylene-(meth)acrylic acid copolymer contributes the repulsion performance of the golf ball. The copolymer (B) further contributes the moldability of the intermediate layer composition. Because of the existence of (C) the resin having the polar functional group at the interface between (A) the polyamide resin and (B) the copolymer, (A) the polyamide resin and (B) the copolymer sufficiently disperse each other. The resin (c) contributes the durability of the golf ball. Since the cover has a hardness H7 of 50 or less, if the golf ball is struck with a short iron, the high spin rate is achieved. The cover contributes the controllability of the golf ball.

In the followings, the preferable embodiments of the present invention will be described, referring to the drawings.

FIG. 1 is a partially cutaway sectional view showing the golf ball 2 according to the preferable embodiment of the present invention. The golf ball 2 comprises a spherical inner core 4, an intermediate layer 6 disposed outside the inner core 4; and a cover 8 disposed outside the intermediate layer 6. The inner core 4 comprises a spherical center 10, and a surrounding layer 12 disposed outside the center 10. The outer core consists of the inner core 4 and the intermediate layer 6 disposed outside the inner core 4. Plurality of dimples 14 are formed on a surface of the cover 8. Other portions than dimples 14 on the surface of the golf ball 2 are land 16. The golf ball 2 are provided with a paint layer and a mark layer outside the cover 2, but these layers are not depicted. The golf ball 2 may further comprise another layer between the surrounding layer 12 and the intermediate layer 6. The golf ball 2 may further comprise another layer between the intermediate layer 6 and the cover 8.

The golf ball 2 has a diameter in a range from 40 mm to 45 mm. In view of meeting the rules of United States Golf Association (USGA), the diameter is preferably 42.67 mm or more. From the view point of decreasing the air resistance, the diameter is preferably 44 mm or less, more preferably 42.80 mm or less. The golf ball 2 has a mass in a range from 40 g to 50 g. In order to give a greater inertia, the mass is preferably 44 g or more, more preferably 45.00 g or more. In order to meet the rules of United States Golf Association (USGA), the mass is preferably 45.93 g or more.

From the view point of the durability, the center 10 preferably has a center hardness H1 of 25 or more, more preferably 30 or more, even more preferably 35 or more in Shore D hardness. From the view point of suppressing the spin rate, the center hardness H1 is preferably 55 or less, more preferably 50 or less, even more preferably 45 or less. The center hardness H1 is measured by pressing the Shore D type durometer at the central point of the cut surface of the hemisphere which is obtained by cutting the center 10. For the measurement, a type P1 auto loading durometer manufactured by Kobunshi Keiki Co., Ltd., which comprises a Shore D type durometer can be used.

In view of the repulsion performance, the center 10 preferably has a surface hardness H2 of 35 or more, more preferably 40 or more, even more preferably 45 or more in Shore D hardness. From the view point of the shot feeling, the surface hardness H2 is preferably 65 or less, more preferably 60 or less, even more preferably 55 or less in Shore D hardness. The surface hardness H2 is measured by pressing the Shore D type hardness tester into the surface of the center 10. For the measurement, a type P1 auto loading durometer manufactured by Kobunshi Keiki Co., Ltd., which comprises a Shore D type durometer can be used.

In view of suppressing the spin rate, the hardness difference (H2−H1) between the surface hardness H2 and the center hardness H1 is preferably 7 or more, more preferably 10 or more, even more preferably 13 or more. From the view point of the durability of the golf ball 2, the hardness difference (H2−H1) is preferably 25 or less, more preferably 20 or less, even more preferably 16 or less.

As described later, the surrounding layer 12 comprises a rubber composition or a resin composition. In the case that the surrounding layer 12 comprises the rubber composition, the center 10 preferably has a diameter in a range from 5 mm to 35 mm. If the center 10 has a diameter of 5 mm or more, the spin rate upon a driver shot is suppressed. From this view point, the diameter is more preferably 10 mm or more. If the center 10 has a diameter of 35 mm or less, the surrounding layer 12, the intermediate layer 6, and the cover can be formed to have a sufficient thickness. From this aspect, the diameter is more preferably 30 mm or less.

In the case that the surrounding layer 12 comprises a resin composition, the center 10 preferably has a diameter in a range from 31 mm to 41 mm. The center 10 having a diameter of 31 mm or more contributes the repulsion performance of the golf ball 2. From this view point, the diameter is more preferably 35 mm or more. If the center 10 has a diameter of 41 mm or less, the surrounding layer 12, the intermediate layer 6, and the cover 8 can be formed to have a sufficient thickness. From this aspect, the diameter is more preferably 40 mm or less.

In the case that the surrounding layer 12 comprises a rubber composition, the center 10 preferably has a compression deformation amount in a range from 4.0 mm to 10.0 mm. The center 10 having a compression deformation amount of 4.0 mm or more contributes the shot feeling of the golf ball 2. From this view point, the compression deformation amount is more preferably 4.5 mm or more. The center 10 having a compression deformation amount of 10.0 mm or less contributes the repulsion performance of the golf ball 2. From this aspect, the compression deformation amount is more preferably 8.0 mm or less.

In the case that the surrounding layer 12 comprises a resin composition, the center 10 preferably has a compression deformation amount in a range from 2.0 mm to 5.0 mm. The center 10 having a compression deformation amount of 2.0 mm or more contributes the shot feeling of the golf ball 2. From this view point, the compression deformation amount is more preferably 2.5 mm or more. The center 10 having a compression deformation amount of 5.0 mm or less contributes the repulsion performance of the golf ball 2. From this aspect, the compression deformation amount is more preferably 4.0 mm or less.

When measuring the compression deformation amount, spheres (the center 10, the inner core 4, the golf ball 2, etc.) are placed on the metal steel plate. As a metal cylinder is gradually descending towards the spheres, the spheres sandwiched between the bottom surface of the cylinder and the steel plate deforms. The compression deformation amount is a moving distance of the cylinder when applying an initial load of 98 N to a final load of 1275 N to the spheres.

The center 10 preferably has a specific gravity in a range from 0.8 to 1.5. The crosslinking temperature for the center 10 is preferably from 140° C. to 180° C. The crosslinking time for the center 10 is preferably from 5 minutes to 60 minutes. The center 10 may be formed with at least two layers. The center 10 may be provided with ribs on the surface thereof.

The surrounding layer 12 comprises a rubber composition or a resin composition. In a preferable embodiment, the surrounding layer 12 is formed by crosslinking the rubber composition. As a base rubber, a polybutadiene rubber, a polyisoprene rubber, a styrene-butadiene copolymer, and ethylene-propylene-diene terpolymer (EPDM) and a natural rubber may be used. Among them, typically preferred is the high cis-polybutadiene having cis-1,4-bond in a proportion of 40% or more, more preferably 70% or more, even more preferably 90% or more in view of its superior repulsion property. In the case that the polybutadiene rubber is used in combination with another rubber, it is preferable that the polybutadiene rubber is a main component. Specifically, the content of the polybutadiene rubber in the total amount of the base rubber is preferably 50 mass % or more, more preferably 80 mass % or more.

A co-crosslinking agent is preferably used for crosslinking the surrounding layer 12. In view of the repulsion performance, preferable examples of the co-crosslinking agent are monovalent or divalent metal salts of α,β-unsaturated carboxylic acid having 3 to 8 carbon atoms. Specific examples are zinc acrylate, magnesium acrylate, zinc methacrylate, and magnesium methacrylate. From the view point of the repulsion property, zinc acrylate and zinc methacrylate are preferred.

In view of the repulsion performance of the golf ball 2, the amount of the co-crosslinking agent is preferably 10 parts or more, more preferably 15 parts or more, even more preferably 20 parts or more based on 100 parts of the base rubber by mass. From the aspect of the soft shot feeling, the amount of the co-crosslinking agent is preferably 50 parts or less, more preferably 45 parts or less, even more preferably 40 parts or less based on 100 parts of the base rubber by mass.

In a preferable embodiment, the rubber composition for the surrounding layer 12 contains an organic peroxide in addition to the co-crosslinking agent. The organic peroxide functions as a crosslinking initiator. The organic peroxide contributes the repulsion performance of the golf ball 2. Preferable examples of the organic peroxide are dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferable in view of the general versatility.

From the view point of the repulsion performance of the golf ball 2, an amount of the organic peroxide is preferably 0.1 part by mass or more, more preferably 0.3 part by mass or more, even more preferably 0.5 part by mass or more. From the aspect of the soft shot feeling, an amount of the organic peroxide is preferably 3.0 parts by mass or less, more preferably 2.8 parts by mass or less, even more preferably 2.5 parts by mass or less based on 100 parts by mass of the base rubber.

In a preferable embodiment, the rubber composition for the surrounding layer 12 contains an organic sulfur compound. The organic sulfur compound described for the center 10 can be used for the surrounding layer 12. The amount of the organic sulfur compound is preferably 0.1 part by mass or more, more preferably 0.2 part by mass or more relative to 100 parts by mass of the base rubber. From the aspect of the soft shot feeling, the amount of the organic sulfur compound is preferably 1.5 parts by mass or less, more preferably 1.0 part by mass or less, even more preferably 0.8 part by mass or less relative to 100 parts by mass of the base rubber.

The surrounding layer 12 may further contain a filler in order to adjust a specific gravity and the like. Preferable examples of the filler are zinc oxide, barium sulfate, calcium carbonate, magnesium carbonate. As the filler, a powder consisting of a high specific gravity metal may be blended. Examples of the high specific gravity metal are tungsten and molybdenum. The amount of the filler can be decided in order to achieve the desired specific gravity of the surrounding layer 12. In particular, the filler is preferably zinc oxide. Zinc oxide functions as the crosslinking auxiliary as well as the specific gravity adjusting agent. The surrounding layer 12 may contain various additives such as sulfur, an antioxidant, a coloring agent, a plasticizer, a dispersant in an appropriate amount, if necessary. The surrounding layer 12 may contain a powder of a crosslinked rubber or a synthetic resin.

In the case that the surrounding layer 12 comprises a resin composition, preferable examples of the base polymer are an ionomer resin, polystyrene, polyester, and polyurethane. In view of the repulsion performance, the ionomer resin is more preferable. From the aspect of the repulsion performance, the ionomer resin and polystyrene may be used in combination.

The surrounding layer 12 preferably has a hardness H3 in a range from 40 to 65 in shore D hardness. The surrounding layer 12 having the hardness of 40 or more in Shore D hardness contributes the repulsion performance of the golf ball 2. From this aspect, the hardness H3 is preferably 42 or more, more preferably 43 or more. The surrounding layer 12 having the hardness of 60 or less in Shore D hardness does not impair the shot feeling of the golf ball 2. From this aspect, the hardness H3 is preferably 63 or less, more preferably 57 or less. The hardness H3 is measured with a type P1 auto loading durometer manufactured by Kobunshi Keiki Co., Ltd., which comprises a Shore D type durometer, according to the prescription of ASTM-D 2240-68. For the measurement, the slab which is molded by a heat press and has a thickness about 2 mm is used. The slab stored at 23° C. for two weeks are used, three or more of the slabs are stacked on one another for the measurement. The slab consisting of the same material as that of the surrounding layer 12 can be used for the measurement.

In the case that the surrounding layer 12 comprises a rubber composition, the surrounding layer 12 preferably has a thickness in a range from 3 mm to 17 mm. The surrounding layer 12 having the thickness of 3 mm or more, can suppress the spin rate upon a driver shot. From this aspect, the thickness is preferably 5 mm or more, more preferably 7 mm or more. In the golf ball 2 having the surrounding layer 12 with the thickness of 17 mm or less, the intermediate layer 6 and the cover 8 can be formed to have a sufficient thickness. From this aspect, the surrounding layer 12 preferably has a thickness of 15 mm or less, more preferably 13 mm or less.

In the case that the surrounding layer 12 comprises a resin composition, the surrounding layer 12 preferably has a thickness in a range from 0.2 mm to 3.0 mm. The surrounding layer 12 has the thickness of 0.2 mm or more can suppress the spin rate upon the driver shot. From this aspect, the thickness is preferably 0.4 mm or more, more preferably 0.6 mm or more. In the golf ball 2 having the surrounding layer 12 with the thickness of 3.0 mm or less, the intermediate layer 6 and the cover 8 can be formed to have a sufficient thickness. From this aspect, the surrounding layer 12 preferably has the thickness of 2.5 mm or less, more preferably 2.0 mm or less.

The inner core 4 preferably has a surface hardness H4 in a range from 45 to 65 in Shore D hardness. The inner core having the hardness of 45 or more contributes the repulsion performance of the golf ball 2. From this aspect, the hardness H4 is preferably 47 or more, more preferably 48 or more. The inner core 4 having the hardness H4 of 65 or less provides an outer-hard inner-soft structure of the sphere (outer core) including the intermediate layer 6. From this aspect, the hardness H4 is preferably 63 or less, more preferably 60 or less. The hardness H4 is measured by pressing the Shore D type durometer to the surface of the inner core 4 (namely, the surface of the surrounding layer 12). For the measurement, a type P1 auto loading durometer manufactured by Kobunshi Keiki Co., Ltd., which comprises a Shore D type durometer can be used.

In view of suppressing the spin rate, the hardness difference (H4−H1) between the surface hardness H4 of the inner core 4 and the center hardness H1 of the center 10 is preferably 18 or more, more preferably 20 or more, even more preferably 25 or more. From the aspect of the productivity and durability, the difference (H4−H1) is preferably 65 or less, more preferably 60 or less, even more preferably 51 or less.

The inner core 4 preferably has a compression deformation amount in a range from 2.0 mm to 4.5 mm. The inner core 4 having the compression deformation amount of 2.0 mm or more can suppress the spin rate upon a driver shot. From this aspect, the compression deformation amount is preferably 2.2 mm or more, more preferably 2.3 mm or more. The inner core 4 having the compression deformation amount of 4.5 mm or less contributes the repulsion performance of the golf ball 2. From this aspect, the compression deformation amount is preferably 4.0 mm or less, more preferably 3.5 mm or less.

The inner core 4 preferably has a diameter in a range from 32 mm to 41.5 mm. The inner core 4 having the diameter in this range can suppress the spin upon a driver shot. From this aspect, the diameter is preferably 34 mm or more, more preferably 39 mm or more. The diameter is preferably 41.0 mm or less, more preferably 40.5 mm or less.

In an embodiment of the present invention, the intermediate layer 6 comprising the highly elastic polyamide resin (A) has a high rigidity. This intermediate layer 6 provides the sphere (outer core) consisting of the inner core 4 and the intermediate layer 6 with the outer-hard inner soft structure. If the golf ball 2 having the outer-hard inner-soft structure is struck with a driver, the high launch angle is obtained. If the golf ball 2 is struck with a driver, the golf ball drives with a low spin rate. The high launch angle and low spin rate give a great flight distance. The polyamide resin (A) also contributes the low temperature durability of the golf ball 2.

The content of the polyamide resin (A) in the resin composition for the intermediate layer 6, is preferably from 16 mass % to 78 mass %. The intermediate layer 6 having the above content of 16 mass % or more achieves an outer-hard inner-soft structure. From this aspect, the content is preferably 20 mass % or more, more preferably 25 mass % or more. The intermediate layer 6 having the above content of 78 mass % or less does not impair the durability and shot feeling of the golf ball 2. From this aspect, the content is preferably 75 mass % or less, more preferably 70 mass % or less.

The content of the copolymer (B) in the resin composition for the intermediate layer 6 is preferably 16 mass % or more and 78 mass % or less. The intermediate layer 16 having the above content of 16 mass % or more can contribute the repulsion performance and durability of the golf ball 2. From this aspect, the content is preferably 20 mass % or more, more preferably 25 mass % or more. The intermediate layer 6 having the above content of 78 mass % or less provides an outer-hard inner-soft structure. From this aspect, the content is preferably 75 mass % or less, more preferably 70 mass % or less.

The mass ratio ((A)/(B)) of the polyamide resin (A) and the copolymer (B) in a resin composition for the intermediate layer 6 is preferably from 20/80 to 80/20. The resin composition having the mass ratio of 20/80 or more provides an outer-hard inner-soft structure. From this aspect, the mass ratio is preferably 25/75 or more, more preferably 30/70 or more. The intermediate layer 6 having the mass ratio of 80/20 or less can contribute the repulsion performance of the golf ball 2. From this aspect, the mass ratio is preferably 75/25 or less, more preferably 70/30 or less.

The content of (C) the resin having a polar functional group is preferably from 0.1 part to 20 parts by mass with respect to 100 parts by mass of the sum of (A) the polyamide resin and (B) the copolymer. If the resin composition has the above content of 0.1 part by mass or more, (A) the polyamide resin and (B) the copolymer disperse each other. From this aspect, the above content is preferably 2 parts by mass or more. The resin composition having the above content of 20 parts by mass or less is excellent in the moldability. From this aspect, the content is preferably 15 parts by mass or less, more preferably 10 parts by mass or less.

The intermediate layer 6 preferably has a hardness H5 in a range from 65 to 75 in Shore D hardness. The intermediate layer 6 having the hardness H5 of 65 or more provides a outer-hard inner-soft structure. From this aspect, the hardness H5 is preferably 66 or more, more preferably 67 or more. The intermediate layer 6 having the hardness H5 of 75 or less does not impair the shot feeling and durability of the golf ball 2. From this aspect, the hardness H5 is preferably 73 or less, more preferably 71 or less.

The hardness H5 is measured with a type P1 auto loading durometer manufactured by Kobunshi Keiki Co., Ltd., which comprises a Shore D type durometer, according to the prescription of ASTM-D 2240-68. For the measurement, the slab which is molded by a heat-pressing and has a thickness about 2 mm is used. The slabs stored at 23° C. for two weeks are used, three or more of the slabs are stacked on one another for the measurement. The slab consisting of the same material as that of the intermediate layer 6 can be used for the measurement.

The intermediate layer 6 preferably has the flexural modulus in a range from 300 MPa to 1,000 MPa. The intermediate layer 6 having the flexural modulus of 300 MPa or more provides an outer-hard inner-soft structure. From this aspect, the flexural modulus is preferably 320 MPa or more, more preferably 350 MPa or more. The intermediate layer 6 having the flexural modulus of 1,000 MPa or less provides an excellent moldability and does not impair the shot feeling and the durability of the golf ball 2. From this aspect, the flexural modulus is 900 MPa or less, more preferably 800 MPa or less. The flexural modulus of the intermediate layer 6 is measured in a same way as that of the measuring method of the flexural modulus of the polyamide resin (A). For the measurement, the test piece made from the same resin composition as that of the intermediate layer 6 is used.

The intermediate layer 6 preferably has the tensile modulus in a range from 400 MPa to 1,500 MPa. The intermediate layer 6 having the tensile modulus modulus of 400 MPa or more provides an outer-hard inner-soft structure. From this aspect, the tensile modulus is preferably 410 MPa or more, more preferably 420 MPa or more. The intermediate layer 6 having the tensile modulus of 1,500 MPa or less does not impair the shot feeling and the durability of the golf ball 2.

From this aspect, the tensile modulus is preferably 1,400 MPa or less, more preferably 1,300 MPa or less.

The tensile modulus is measured according to the prescription of ISO 178. Prior to the measurement, a sheet which has the same composition as the resin composition of the intermediate layer 6 can be molded by an injection molding method. The obtained sheet has a thickness of 2 mm. After the sheet is stored at 23° C. for two weeks, test pieces are stamped out of the sheet to have a dumbbell-shape. The test pieces are used for the measurement.

The intermediate layer 6 preferably has a thickness in a range from 0.3 mm to 3.0 mm. The intermediate layer 6 having the thickness of 0.3 mm or more suppresses the spin rate upon a driver shot. From this aspect, the thickness is preferably 0.5 mm or more, more preferably 0.7 mm or more. The intermediate layer 6 having the thickness of 3.0 mm or less does not impair the shot feeling. From this aspect, the thickness is preferably 2.0 mm or less, more preferably 1.5 mm or less.

The spherical outer core consisting of the inner core 4 and the intermediate layer 6 preferably has a surface hardness H6 in a range from 65 to 80 in Shore D hardness. The spherical outer core having the surface hardness of 65 or more suppresses the spin rate upon a driver shot. From this aspect, the hardness H6 is preferably 67 or more, more preferably 69 or more. The spherical outer core having the hardness H6 of 80 or less does not impair the shot feeling of the golf ball 2. From this aspect, the hardness H6 is preferably 78 or less, more preferably 75 or less. The hardness H6 is measured by pressing the Shore D type durometer to the surface of the outer core (namely, the surface of the intermediate layer 6). For the measurement, a type P1 auto loading durometer manufactured by Kobunshi Keiki Co., Ltd., which comprises a Shore D type durometer can be used.

The surface hardness H4 of the inner core 4 is equal to or lower than the surface hardness H6 of the spherical outer core consisting of the inner core 4 and the intermediate layer 6. The golf ball 2 configured like this suppresses the spin upon a driver shot. From this aspect, the hardness difference (H6−H4) is preferably 3 or more, more preferably 4 or more, even more preferably 5 or more. The hardness difference (H6−H4) is preferably 25 or less.

If the golf ball 2 is struck with a driver, a long iron, or a short iron, since the head speed is high, the spherical outer core consisting of the inner core 4 and the intermediate layer 6 deforms significantly. Since the outer core has a outer-hard inner-soft structure, the spin rate is suppressed. Because of suppressing the spin rate, the great flight distance is obtained. If the golf ball 2 is struck with a short iron, since the head speed is low, the deformation of the spherical outer core is small. The behavior of the golf ball 2 when struck with a short iron is primarily dependent upon the cover 8. Since the cover 8 is soft, the high spin rate is achieved. The high spin rate provides an excellent controllability. In the golf ball 2, a good balance between the flight performance upon a shot with a driver, a long iron, or a middle iron, and the controllability upon a shot with a short iron can be achieved.

If the golf ball 2 is struck, the cover 8 absorbs the impact. This absorption provides a soft shot feeling. Especially, when struck with a short iron or a putter, the excellent shot feeling can be obtained by the cover 8.

For the cover 8, polyurethane can be used in combination with another resin. In the case of using another resin in combination, it is preferable to use polyurethane as a main component of the base polymer in view of the spin rate and shot feeling. The mass ratio of the polyurethane with respect to the total amount of the base polymer is preferably 50 mass % or more more preferably 70 mass % or more, even more preferably 85 mass % or more.

The cover 8 preferably has a hardness H7 in a range from 10 to 50 in Shore D hardness. The cover 8 having the hardness H7 of 10 or more does not impair the repulsive performance the golf ball 2. From this aspect, the hardness H7 is preferably 15 or more, more preferably 25 or more. The cover 8 having the hardness H7 of 50 or less contributes the controllability of the golf ball 2. From this aspect, the hardness H7 is preferably 45 or less, more preferably 40 or less. For the measurement, the slab made from the same resin composition as that of the cover 8 is used. The measuring method is similar to the measuring method of the hardness H5 of the intermediate layer 6.

The cover 8 preferably has a thickness in a range from 0.10 mm to 0.8 mm. The cover 8 having the thickness of 0.10 mm or more contributes the controllability of the golf ball 2. From this aspect, the thickness is preferably 0.15 mm or more. The cover 8 having the thickness of 0.8 mm or less does not cause an excess of spin upon a driver shot. From this aspect, the thickness is preferably 0.5 mm or less, more preferably 0.4 mm or less.

For molding the cover 8, known methods such as the injection molding method and the compression molding method can be employed. When molding the cover 8, the dimples 14 are formed by pimples formed on the cavity face of the molds.

From the aspect of the shot feeling, the golf ball 2 preferably has a compression deformation amount D of 2.0 mm or more, more preferably 2.1 mm or more, even more preferably 2.2 mm or more. In view of the repulsive performance, the compression deformation amount D is preferably 3.5 mm or less, more preferably 3.0 mm or less, even more preferably 2.6 mm or less.

The golf ball 2 may further comprise a reinforcing layer between the intermediate layer 6 and the cover 8. The reinforcing layer adheres to the intermediate layer 6 as well as the cover 8 firmly. The reinforcing layer suppresses the delamination of the cover 8 from the intermediate layer 6. As described above, the cover 8 of the golf ball 2 is thin. If the golf ball 2 is struck with the edge of the club face, the wrinkles tend to occur. The reinforcing layer suppresses the wrinkles.

As a base polymer for the reinforcing layer, a two-(liquid) component curing type thermosetting resin can be preferably used. Examples of the two-(liquid) component curing type thermosetting resin are an epoxy resin, a urethane resin, an acrylic resin, a polyester based resin, a cellulose based resin. From the aspect of the strength and the durability of the reinforcing layer, the two-(liquid) component curing type epoxy resin or two-(liquid) component curing type urethane resin are preferable.

The reinforcing layer is obtained by coating the liquid where a base component and a curing agent are solved or dispersed in a solvent on the surface of the intermediate layer 6. From the workability, coating with a spray gun is preferable. After the coating, the solvent volatiles, the base component and the curing agent react each other, and thus the reinforcing layer is formed.

From the aspect of suppressing the wrinkles, the reinforcing layer preferably has a thickness of 3 μm or more, more preferably 5 µm or more. In order to facilitate the formation of the reinforcing layer, the thickness thereof is preferably 300 µm or less, more preferably 50 µm or less, even more preferably 20 µm or less. The thickness is measured by observing the sectional view of the golf ball 2 with a microscope. If the intermediate layer 6 has concave and convex portions on the surface thereof by the rough surface treatment, the thickness is measured directly on the convex portions.

(4) Method for Producing a Golf Ball

In the followings, a method for producing a golf ball of the present invention will be explained.

The center can be obtained by mixing, kneading the above mentioned rubber composition and molding the rubber composition in the mold. The conditions for press-molding the center rubber composition should be determined depending on the rubber composition. The press-molding is preferably carried out for 10 to 60 minutes at the temperature of 130° C. to 200° C. under the pressure of 2.9 MPa to 11.8 MPa. Specifically, the press-molding is preferably carried out for 10 to 60 minutes at the temperature of 130° C. to 200° C. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

One example of the process for forming the intermediate layer is to cover the center with the highly elastic intermediate layer composition or another intermediate layer composition to form an intermediate layer. The process for forming the intermediate layer is not particularly limited. In one example, the highly elastic intermediate layer composition is molded into hemispherical half shells in advance, and then the center is covered with two half shells and press-molded at the temperature of 130° C. to 170° C. for 1 to 5 minutes. In another example, the highly elastic intermediate layer composition is injection-molded directly onto the center so as to cover the center.

In a process for producing the golf ball of the present invention, (A) the highly elastic polyamide resin, (B) the metal neutralized copolymer, and (C) the resin having a polar functional group are blended, and an additive is blended therewith according to need, to obtain a highly elastic intermediate layer composition. For this blending of the highly elastic intermediate layer composition, for example, it is preferable to use a mixer capable of blending pellet materials, and it is more preferable to use a tumble mixer. Embodiments for blending the highly elastic intermediate layer composition include an embodiment in which (A) the highly elastic polyamide resin, (B) the metal neutralized copolymer, (C) the resin having a polar functional group, and an additive such as titanium oxide or the like are blended and extruded to prepare a pellet; and an embodiment in which an additive such as titanium oxide or the like is blended with (B) the metal neutralized copolymer and extruded to prepare a white pellet in advance, then the white pellet and the respective pellets of (A) the highly elastic polyamide resin and the resin (C) having a polar functional group are dry-blended.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding). In the case of directly injection molding the cover composition onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 230° C. is charged into a mold held under the pressure of 980 KPa to 1,500 KPa for 0.1 to 1 second. After cooling for 15 to 60 seconds, the mold is opened and the golf ball with the cover molded is taken out from the mold.

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a cover for a golf ball having a uniform thickness can be formed.

After the cover is molded, the mold is opened and the golf ball body is taken out from the mold, and as necessary, the golf ball body is preferably subjected to surface treatment such as deburring, cleaning, and sandblast. If desired, a paint film or a mark may be formed. The paint film preferably has a thickness of, but not limited to, 5 µm or larger, and more preferably 7 µm or larger, and preferably has a thickness of 25 µm or smaller, and more preferably 18 µm or smaller. This is because if the thickness is smaller than 5 µm, the paint film is easy to wear off due to continued use of the golf ball, and if the thickness is larger than 25 µm, the effect of the dimples is reduced, resulting in deteriorating flying performance of the golf ball.

EXAMPLES

Hereinafter, the present invention will be described in detail by way of example. The present invention is not limited to examples described below. Various changes and modifications can be made without departing from the spirit and scope of the present invention.

(1) Flexural Modulus (MPa)

(A) Test pieces with a length of 80.0±2 mm, a width of 10.0±0.2 mm, and a thickness of 4.0±0.2 mm were produced by injection molding using a dry pellet of the highly elastic polyamide resin, and immediately stored at 23° C.±2° C. for 24 hours or more in a moisture-proof container. The test pieces were taken out from the moisture-proof container and immediately (within 15 minutes) the flexural modulus of the test pieces were measured according to ISO178. The measurement was conducted at a temperature of 23° C. and a humidity of 50% RH.

(B) Test pieces with a length of 80.0±2 mm, a width of 10.0±0.2 mm, and a thickness of 4.0±0.2 mm were produced by injection molding using the metal neutralized copolymer (B) or the highly elastic intermediate layer composition, and stored at 23° C. for two weeks under the humidity of 50% RH. The flexural modulus of the test pieces were measured according to ISO178. The measurement was conducted at a temperature of 23° C. and a humidity of 50% RH.

(2) Tensile Modulus (MPa)

A sheet with a thickness of about 2 mm was produced by injection molding a highly elastic intermediate layer composition, and stored at 23° C. for two weeks. A dumbbell-shaped test piece was produced from this sheet, and the tensile modulus of the test piece was measured according to ISO 527-1.

(3) Slab Hardness (Shore D Hardness)

Sheets with a thickness of about 2 mm were produced by injection molding a cover composition or a highly elastic intermediate layer composition, and stored at 23° C. for two weeks. Three or more of these sheets were stacked on one another so as not to be affected by the measuring base on which the sheets were placed, and the stack was measured with a type P1 auto loading durometer manufactured by Kobunshi Keiki Co., Ltd., which comprises a Shore D type spring hardness tester prescribed in ASTM-D2240.

(4) Hardness of Center and Core (Shore D Hardness)

A type P1 auto loading durometer manufactured by Kobunshi Keiki Co., Ltd., which comprises a Shore D type spring hardness tester prescribed in ASTM-D2240 was used to measure the surface hardness of the center, the core, and the golf ball. Shore D hardness measured at the surfaces of the center, the core and the golf ball are defined as the surface hardness of the center, the core, and the golf ball, respectively. The core was cut into two hemispheres to obtain a cut plane, and a Shore D hardness measured at the center of the cut plane was used as the center hardness of the center or the core.

(5) Compression Deformation Amount (mm)

A compression deformation amount of the golf ball or the core (a shrinking amount of the golf ball or the core in the compression direction thereof), when applying an initial load of 98 N to a final load of 1275 N, was measured.

(6) Durability

A metal-headed W#1 driver (XXIO S, loft: 11°, manufactured by SRI Sports Limited) was installed on a swing robot M/C manufactured by Golf Laboratories, Inc. Each golf ball was hit at a head speed of 45 m/sec. This procedure was repeated, and the number of hits required to break the golf ball was counted. It is noted that there was a case where the golf ball looks unbroken but a crack occurs in the intermediate layer. In such a case, whether or not the golf ball was broken was determined based on deformation of the golf ball and difference in sound at hitting of the golf ball.

The number of hits for golf ball No. 9 was defined as an index of 100, and the durability of each golf ball was represented by converting the number of hits for each golf ball into this index. A greater index value indicates that the durability of the golf ball is excellent.

(7) Low Temperature Durability

Ten golf balls for each golf ball were made to collide with a metal board with an air gun at the speed of 45 m/sec., immediately after stored at the temperature of −10° C. for 1 day. This procedure was repeated, and the number of hits required to break the golf ball was counted. The results of the ten golf balls were averaged. It is noted that there was a case where the golf ball looks unbroken but a crack occurs in the intermediate layer. In such a case, whether or not the golf ball was broken was determined based on deformation of the golf ball and difference in sound at hitting of the golf ball.

The number of hits for golf ball No. 9 was defined as an index of 100, and the low temperature durability of each golf ball was represented by converting the number of hits for each golf ball into this index. A greater index value indicates that the durability of the golf ball is excellent.

(8) Shot with a Driver

A metal-headed W#1 driver (XXIO S, loft: 11°, manufactured by SRI Sports Limited) was installed on a swing robot M/C manufactured by Golf Laboratories, Inc. A golf ball was hit at a head speed of 50 m/sec, and the speed of the golf ball immediately after the hit, the launch angle, the spin rate, and the flight distance (the distance from the launch point to the stop point) were measured. This measurement was conducted twelve times for each golf ball, and the average value was used as the measurement value for the golf ball. Regarding the speed of the golf ball immediately after the hit and the spin rate, a sequence of photographs of the hit golf ball were taken to measure the spin rate and the initial ball speed.

(9) Shot with a Short Iron

A sand wedge was installed on a swing robot M/C manufactured by Golf Laboratories, Inc. A golf ball was hit at a head speed of 21 m/sec. The measurement was conducted twelve times for each golf ball, and the average value was used as the spin rate. The range of the spin rate is the difference between the maximum value and the minimum value among the spin rates of twelve times. A narrower range of the spin rate indicates that the spin stability is high.

Evaluation Criteria for Range of Spin Rate

A: The range is less than 100 rpm.
B: The range is 100 rpm or more and 200 rpm or less.
C: The range is 200 rpm or more.

[Production of Golf Balls No. 1 to No. 15]

(1) Production of Center

A center was obtained by kneading a rubber composition having the formulation shown in Table 1, and heat-pressing the kneaded material in upper and lower molds, each having a hemispherical cavity, at 170° C. for 30 minutes.

TABLE 1

| | Center | | |
|---|---|---|---|
| Formulation | Polybutadiene | 100 | |
| | Zinc acrylate | 31.5 | |
| | Zinc oxide | 5 | |
| | Barium sulfate | Appropriate amount*) | |
| | Diphenyl disulfide | 0.3 | |
| | Dicumyl peroxide | 0.9 | |
| Properties | Diameter (mm) | 38.6 | |
| | Surface hardness (Shore D hardness) | 60 | |
| | Compression deformation amount (mm) | 2.99 | |

Formulation: parts by mass
*)Depending on the cover composition, adjustment was made such that the golf ball had a mass of 45.4 g.
Polybutadiene rubber: "BR-730 (high-cis polybutadiene)" manufactured by JSR Corporation.
Zinc acrylate: "ZNDA-90S" manufactured by Nihon Jyoryu Kogyo Co., Ltd.
Zinc oxide: "Ginrei R" manufactured by Toho Zinc Co., Ltd.
Barium sulfate: "Barium Sulfate BD" manufactured by Sakai Chemical Industry Co., Ltd.
Diphenyl disulfide: manufactured by Sumitomo Seika Chemicals Co., Ltd.
Dicumyl peroxide: "Percumyl (registered trademark) D" manufactured by NOF Corporation.

It is noted that an appropriate amount of barium sulfate was added such that the obtained golf ball had a mass of 45.4 g.

(2) Preparation of Cover Composition and Highly Elastic Intermediate Layer Composition Blending materials shown in Tables 2 and 3 were mixed with a twin-screw kneading extruder to prepare a cover composition in the pellet form and a highly elastic intermediate layer composition in the pellet form, respectively. The extruding conditions were a screw diameter of 45 mm, a screw rotational speed of 200 rpm, and screw L/D=35, and the mixtures were heated to 160 to 230° C. at the die position of the extruder.

TABLE 2

| Cover composition | | |
|---|---|---|
| Formulation | Elastollan XNY85A | 100 |
| | Titanium oxide | 4 |
| Properties | Slab hardness (Shore D hardness) | 32 |

Formulation: parts by mass
Elastollan XNY85A: a thermoplastic polyurethane elastomer manufactured by BASF Japan Ltd.

(3) Production of Golf Ball Body

A spherical core was produced by injection-molding the highly elastic intermediate layer composition onto the center thus obtained to form an intermediate layer covering the center. Then, a golf ball was produced by injection-molding the cover composition onto the spherical core to form a cover. Upper and lower molds have a spherical cavity with pimples, a part of which serves as a hold pin which is extendable and retractable. The hold pins were protruded to hold the core, the resin heated to 210° C. was charged into the mold under a pressure of 80 tons within 0.3 seconds, and cooled for 30 seconds. Then, the mold was opened, and the golf ball body was taken out from the mold. The surface of the obtained golf ball body was treated with sandblast, marked, and painted with a clear paint. The paint was dried in an oven at 40° C., and golf balls with a diameter of 42.8 mm and a mass of 45.4 g were obtained.

The evaluation results of durability, compression deformation amount, and flight distance for the obtained golf ball are shown in Tables 3 to 5.

TABLE 3

| | | | | Golf ball No. | | | | |
|---|---|---|---|---|---|---|---|---|
| | | | | 1 | 2 | 3 | 4 | 5 |
| Core | Center Diameter (mm) | | | 38.6 | 38.6 | 38.6 | 38.6 | 38.6 |
| Intermediate layer | Formulation | (B) | SURLYN 8945 | 20 | 20 | 40 | 30 | 30 |
| | | | HIMILAN AM7329 | 20 | 20 | 40 | 30 | 30 |
| | | | PRIMALLOY B1942N | — | — | — | — | — |
| | | (C) | LOTADER AX8840 | 1 | 1 | 5 | 5 | 3 |
| | | | ARUFON UG-4030 | — | — | — | — | 2 |
| | | (A) | NOVAMID ST220 | 60 | — | 20 | 40 | 40 |
| | | | AMILAN U141 | — | 60 | — | — | — |
| | | | PEBAX 4033SA | — | — | — | — | — |
| | | | Titanium oxide | 4 | 4 | 4 | 4 | 4 |
| | Slab Hardness (Shore D) | | | 67 | 70 | 66 | 66 | 67 |
| | Slab Flexural modulus (MPa) | | | 450 | 495 | 480 | 390 | 400 |
| | Slab Tensile modulus (MPa) | | | 540 | 600 | 560 | 590 | 560 |
| | Thickness (mm) | | | 1.6 | 1.6 | 1.6 | 1.6 | 1.6 |
| | Central hardness (Shoe D Hardness) | | | 42 | 42 | 42 | 42 | 42 |
| | Surface hardness (Shore D hardness) | | | 69 | 72 | 68 | 68 | 69 |
| | Compression deformation amount (mm) | | | 2.46 | 2.40 | 2.47 | 2.47 | 2.45 |
| | Cover Cover Thickness (mm) | | | 0.5 | 0.5 | 0.5 | 0.5 | 0.5 |
| Body evaluation | Surface hardness (Shore D) | | | 65 | 68 | 65 | 65 | 65 |
| | Compression deformation amount (mm) | | | 2.42 | 2.38 | 2.42 | 2.42 | 2.41 |
| | Durability (Index) | | | 110 | 110 | 120 | 110 | 115 |
| | Low-temperature Durability (Index) | | | 100 | 100 | 110 | 105 | 110 |
| | Shot with driver | Ball speed (m/s) | | 74 | 74 | 74 | 74 | 74 |
| | | Launch angle (°) | | 11.4 | 11.5 | 11.4 | 11.5 | 11.5 |
| | | Spin rate (rpm) | | 2480 | 2450 | 2470 | 2350 | 2340 |
| | | Flight distance (m) | | 273 | 276 | 273 | 275 | 275 |
| | Shot with short iron | Spin rate (rpm) | | 5315 | 5295 | 5310 | 5290 | 5290 |
| | | Spin stability | | A | A | A | A | A |

Formulation: parts by mass

TABLE 4

| | | | | Golf ball No. | | | | |
|---|---|---|---|---|---|---|---|---|
| | | | | 6 | 7 | 8 | 9 | 10 |
| Core | Center Diameter (mm) | | | 38.6 | 38.6 | 38.6 | 38.6 | 38.6 |
| Intermediate layer | Formulation | (B) | SURLYN 8945 | 20 | 20 | 15 | 50 | 45 |
| | | | HIMILAN AM7329 | 20 | 20 | 15 | 50 | 45 |
| | | | PRIMALLOY B1942N | — | — | — | — | — |
| | | (C) | LOTADER AX8840 | 5 | 10 | 15 | — | 5 |
| | | | ARUFON UG-4030 | — | — | — | — | — |
| | | (A) | NOVAMID ST220 | 60 | 60 | 70 | — | — |
| | | | AMILAN U141 | — | — | — | — | — |
| | | | PEBAX 4033SA | — | — | — | — | 10 |
| | | | Titanium oxide | 4 | 4 | 4 | 4 | 4 |
| | Slab Hardness (Shore D) | | | 68 | 66 | 67 | 65 | 63 |

TABLE 4-continued

|  |  | Golf ball No. | | | | |
| --- | --- | --- | --- | --- | --- | --- |
|  |  | 6 | 7 | 8 | 9 | 10 |
|  | Slab Flexural modulus (MPa) | 500 | 470 | 510 | 282 | 260 |
|  | Slab Tensile modulus (MPa) | 800 | 750 | 870 | 380 | 280 |
|  | Thickness (mm) | 1.6 | 1.6 | 1.6 | 1.6 | 1.6 |
|  | Central hardness (Shoe D Hardness) | 42 | 42 | 42 | 42 | 42 |
|  | Surface hardness (Shore D hardness) | 70 | 68 | 69 | 68 | 65 |
|  | Compression deformation amount (mm) | 2.43 | 2.47 | 2.44 | 2.42 | 2.53 |
|  | Cover Cover Thickness (mm) | 0.5 | 0.5 | 0.5 | 0.5 | 0.5 |
| Body evaluation | Surface hardness (Shore D) | 66 | 65 | 65 | 63 | 59 |
|  | Compression deformation amount (mm) | 2.40 | 2.42 | 2.41 | 2.40 | 2.50 |
|  | Durability (Index) | 100 | 100 | 100 | 100 | 80 |
|  | Low-temperature Durability (Index) | 100 | 100 | 100 | 100 | 70 |
| Shot with driver | Ball speed (m/s) | 74 | 74 | 74 | 74 | 70 |
|  | Launch angle (°) | 11.2 | 11.4 | 11.4 | 11.3 | 11.0 |
|  | Spin rate (rpm) | 2300 | 2450 | 2430 | 2700 | 2850 |
|  | Flight distance (m) | 271 | 271 | 272 | 270 | 268 |
| Shot with short iron | Spin rate (rpm) | 5280 | 5290 | 5260 | 5340 | 5400 |
|  | Spin stability | A | A | A | C | C |

Formulation: parts by mass

TABLE 5

|  |  |  | Golf ball No. | | | | |
| --- | --- | --- | --- | --- | --- | --- | --- |
|  |  |  | 11 | 12 | 13 | 14 | 15 |
| Core | Center Diameter (mm) |  | 38.6 | 38.6 | 38.6 | 38.6 | 38.6 |
| Intermediate layer | Formulation | (B) SURLYN 8945 | — | 5 | 45 | 40 | 40 |
|  |  | HIMILAN AM7329 | — | 5 | 45 | 40 | 40 |
|  |  | PRIMALLOY B1942N | 100 | — | — | — | — |
|  |  | (C) LOTADER AX8840 | — | 5 | 5 | 25 | 0.05 |
|  |  | ARUFON UG-4030 | — | — | — | — | — |
|  |  | (A) NOVAMID ST220 | — | 90 | 10 | 20 | 20 |
|  |  | AMILAN U141 | — | — | — | — | — |
|  |  | PEBAX 4033SA | — | — | — | — | — |
|  |  | Titanium oxide | 4 | 4 | 4 | 4 | 4 |
|  | Slab Hardness (Shore D) |  | 69 | 76 | 64 | 62 | 66 |
|  | Slab Flexural modulus (MPa) |  | 400 | 600 | 290 | 210 | 320 |
|  | Slab Tensile modulus (MPa) |  | 450 | 960 | 360 | 300 | 390 |
|  | Thickness (mm) |  | 1.6 | 1.6 | 1.6 | 1.6 | 1.6 |
|  | Central hardness (Shoe D Hardness) |  | 42 | 42 | 42 | 42 | 42 |
|  | Surface hardness (Shore D hardness) |  | 71 | 78 | 67 | 65 | 68 |
|  | Compression deformation amount (mm) |  | 2.38 | 2.32 | 2.45 | 2.55 | 2.47 |
|  | Cover Cover Thickness (mm) |  | 0.5 | 0.5 | 0.5 | 0.5 | 0.5 |
| Body Evaluation | Surface hardness (Shore D) |  | 68 | 73 | 62 | 60 | 64 |
|  | Compression deformation amount (mm) |  | 2.32 | 2.30 | 2.42 | 2.50 | 2.45 |
|  | Durability (Index) |  | *1) | 50 | 120 | 100 | 99 |
|  | Low-temperature Durability (Index) |  | *1) | 30 | 110 | 95 | 95 |
| Shot with driver | Ball speed (m/s) |  | — | 71 | 73 | 71 | 73 |
|  | Launch angle (°) |  | — | 10.9 | 11.3 | 10.8 | 11.0 |
|  | Spin rate (rpm) |  | — | 2100 | 2780 | 2900 | 2500 |
|  | Flight distance (m) |  | — | 265 | 269 | 264 | 270 |
| Shot with short iron | Spin rate (rpm) |  | — | 5200 | 5380 | 5500 | 5350 |
|  | Spin stability |  | — | C | B | C | B |

Formulation: parts by mass
*1) They were unmeasurable because the golf balls were broken by one hit.

Notes on tables 3 to 5
Formulation: parts by mass
SURLYN 8945: a sodium ion neutralized ethylene-methacrylic acid copolymer ionomer resin (flexural modulus: 254 MPa) available from E.I. du Pont de Nemours and Company.
HIMILAN AM7329: a zinc ion neutralized ethylene-methacrylic acid copolymer ionomer resin (flexural modulus: 236 MPa) available from Du Pont-Mitsui Polychemicals Co., Ltd.
Primalloy B1942N: a thermoplastic polyester elastomer available from Mitsubishi Chemical Corporation.

LOTADER AX8840: an ethylene-acrylic acid-glycidyl methacrylate copolymer (amount of monomer containing a polar functional group: 8 mass %) available from Tokyo Zairyo Co., Ltd.

AFURON UG-4030: a methyl methacrylate-glycidyl methacrylate copolymer (amount of monomer containing a polar functional group: 0.02 mass %, epoxy number: 1.8 meq/g) available from Toagosei Co., Ltd.

NOVAMID ST220: Polyamide resin (High impact resistance grade, flexural modulus: 2,000 MPa) available from Mitsubishi Engineering-Plastics Company.

AMILAN U141: Polyamide resin (Super high impact resistance grade, flexural modulus: 1,500 MPa)

PEBAX 4033SA: Polyetherblockamide copolymer (flexural modulus: 84 MPa) available from Tokyo Zairyo Co., Ltd.

Each of Golf balls No. 1 to 8 is the case that the intermediate layer is formed from the highly elastic intermediate layer composition. It is obvious that these golf balls No. 1 to 8 have improved low temperature durability and flight distance as compared to golf ball No. 9 that includes an intermediate layer formed from an intermediate layer composition consisting of an ionomer resin as a resin component. Golf ball No. 10 is the case that the flexural modulus of the polyamide resin used for the intermediate layer composition is low and the amount thereof is low. Thus, the low temperature durability and flight distance became lowered. Golf ball No. 11 is the case that the intermediate layer is formed from the intermediate layer composition consisting of an polyester resin as a resin component. The durability at the practical level was not obtained.

Golf balls No. 12 and 13 are the cases that the ratio ((A)/(B)) of (A) the highly elastic polyamide resin and (B) the metal neutralized copolymer in an intermediate layer composition is 90 parts by mass/10 parts by mass and 10 parts by mass/90 parts by mass, respectively. In the case of the golf ball No. 12 containing (A) the highly elastic polyamide resin to excess, the low temperature durability and flight distance were both lowered. In the case of the golf ball No. 13 containing (A) the highly elastic polyamide resin in less amount, the flight distance was lowered, although the low temperature durability was excellent. Golf ball No. 14 is the case that the content of (C) the resin having the functional group is contained is 25 parts by mass, while the golf ball No. 15 is the case that the content of (C) the resin having the functional group is contained is 0.05 part by mass, with respect to the total amount (100 parts by mass) of (A) the highly elastic polyamide resin and (B) the metal neutralized copolymer. The low temperature durability and the flight performance were both lowered for the golf ball No. 14 and the low temperature durability was lowered for the golf ball No. 15.

[Production of Golf Balls No. 16 to No. 27]

[Golf Ball No. 16]

100 parts by mass of high cis-polybutadiene ("BR-730" available from JSR Corporation), 20 parts by mass of zinc acrylate, 10 parts by mass of zinc oxide, appropriate amount of barium sulfate, 0.5 part by mass of diphenyl disulfide, and 0.8 part by mass of dicumyl peroxide were kneaded to obtain a rubber composition (i). The rubber composition (i) was charged into a mold having upper and lower molds each having a hemispherical cavity, and heated at the temperature of 170° C. for 30 minutes to obtain a center having a diameter of 20.1 mm. The amount of the barium sulfate was adjusted to make the golf ball have a mass of 45.4 g.

100 parts by mass of high cis-polybutadiene ("BR-730" described above), 38 parts by mass of zinc acrylate, 5 parts by mass of zinc oxide, 5 parts by mass of barium sulfate, 0.5 part by mass of diphenyl disulfide, and 0.8 part by mass of dicumyl peroxide were kneaded to obtain a rubber composition (a). The rubber composition (a) was formed into half shells. The above center was enveloped with the two half shells. The center together with the half shells was charged into a mold having upper and lower molds each having a hemispherical cavity, and heated at the temperature of 170° C. for 30 minutes to form a surrounding layer. The inner core consisting of the center and the surrounding layer has a diameter of 39.7 mm.

20 parts by mass of sodium ion neutralized ethylene-(meth)acrylic acid copolymer ("SURLYN 8945" described above) and 20 parts by mass of zinc ion neutralized ethylene-(meth)acrylic acid copolymer ("HIMILAN AM7329" described above) and 60 parts by mass of the highly elastic polyamide ("NOVAMID ST220" described above) and 1 part by mass of the resin having the functional group ("LOTADER AX8840" described above) and 4 parts by mass of titanium dioxide were kneaded with a twin-screw extruder to obtain a resin composition (d). The inner core was set into a mold having upper and lower molds each having a hemispherical cavity. The resin composition (d) was injected around the core by an injection-molding method to form the intermediate layer. The thickness of the intermediate layer was 1.0 mm.

A coating composition ("Polyn 750 LE" available from SHINTO PAINT Co., LTD.) comprising a two-part curing type epoxy resin as a base polymer was prepared. The base liquid of the coating composition comprises 30 parts by mass of a bisphenol A type solid epoxy resin and 70 parts by mass of a solvent. The curing liquid of the coating composition comprises 40 parts by mass of the modified polyamide amine, 55 parts by mass of a solvent, and 5 parts by mass of titanium oxide. The mass ratio of the base liquid and the curing liquid equals to 1/1. The coating composition was applied with a spray gun to the surface of the intermediate layer, kept at the atmosphere of 40° C. for 24 hours to obtain a reinforcing layer. The thickness of the reinforcing layer was 10 μm.

100 parts by mass of the thermoplastic polyurethane elastomer ("Elastollan XNY85A" described above) and 4 parts by mass of titanium dioxide were kneaded with a twin screw extruder to obtain a resin composition (x). The resin composition (x) was formed into half shells by a compression molding method. The sphere (outer core) consisting of the inner core, the intermediate layer and the reinforcing layer was enveloped with the two half shells. The sphere (outer core) and half shells were set into a finishing mold having upper and lower molds each having a hemispherical cavity with plurality of pimples on the surface thereof to form a cover by a compression molding method. The thickness of the cover was 0.5 mm. Dimples having a shape which is the reversed shape of the pimples are formed on the cover. The clear paint comprising a two part curing type polyurethane as a base was coated on the cover to obtain a golf ball No. 16 having a diameter of 42.7 mm.

[Golf Balls No. 17 to No. 28]

Golf balls No. 17 to No. 28 were produced in the same way as Golf ball No. 16, except that the specifications of the center, surrounding layer, intermediate layer, and cover were changed as shown in Tables 10 to 12. The specifications of the center composition, the surrounding layer composition, the intermediate layer composition, and the cover composition are shown in Tables No. 6, No. 7, No. 8, and No. 9, respectively. The golf ball No. 28 does not have a surrounding layer.

[Shot with a Driver(W#1)]

A titanium-headed W#1 driver (Commercial name: "XXIO", shaft hardness: S, loft: 11°, manufactured by SRI Sports Limited) was installed on a swing robot manufactured by Golf Laboratories, Inc. A golf ball was hit at a head speed of 50 m/sec. The speed of the golf ball immediately after the hit and the flight distance (the distance from the launch point to the stop point) were measured. This measurement was conducted twelve times for each golf ball, and the average values thereof were shown in Tables No. 10 to No. 12. The golf ball No. 23 was broken by one hit.

[Shot with a Short Iron]

A sand wedge (SW) was installed on a swing robot manufactured by Golf Laboratories, Inc. A golf ball was hit at a head speed of 21 m/sec to measure the spin rate right after the hit. The measurement was conducted twelve times for each golf ball, and the average values were shown in Tables No. 10 to No. 12.

The golf balls were actually hit by ten golfers, from whom the shot feelings were heard. The shot feelings were ranked into the following criteria, based on the number of the golfers who answered "The impact is small and the shot feeling is good."
A: 8 or more golfers
B: 6 to 7 golfers
C: 4 to 5 golfers
D: 3 or less golfers
The results are shown in Tables No. 10 to No. 12.

[Durability]

A titanium-headed driver was installed on a swing robot manufactured by Golf Laboratories, Inc. Each golf ball was hit at a head speed of 45 m/sec. This procedure was repeated, and the number of hits required to break the golf ball was counted. The measurement was conducted 6 times, and the averaged values thereof were shown as an index in Tables No. 10 to No. 12.

[Low Temperature Durability]

Ten golf balls were stored in a constant temperature reservoir kept at the temperature of −10° C. for 24 hours, then were shot with an air gun at the speed of 45 m/sec. to collide with a metal board. This procedure was repeated, and the number of hits required to break the golf ball was counted. The results of the six golf balls were averaged, and the averaged values were shown as an index in Tables No. 10 to 12.

TABLE 6

| Center composition | i | ii | iii |
|---|---|---|---|
| BR-730 | 100 | 100 | 100 |
| Zinc acrylate | 20 | 36 | 40 |
| Zinc oxide | 10 | 10 | 10 |
| Barium sulfate | Appropriate Amount*) | Appropriate amount*) | Appropriate Amount*) |
| Diphenyl disulfide | 0.5 | 0.5 | 0.5 |
| Dicumyl peroxide | 0.8 | 0.8 | 0.8 |
| Center hardness H1 (Shore D hardness) | 30 | 40 | 43 |
| Surface hardness H2 (Shore D hardness) | 44 | 57 | 60 |

TABLE 7

| Surrounding layer Composition | a | b | c |
|---|---|---|---|
| BR-730 | 100 | — | — |
| Zinc acrylate | 38 | — | — |
| Zinc oxide | 5 | — | — |
| Barium sulfate | 5 | — | — |
| Diphenyl disulfide | 0.5 | — | — |
| Dicumyl peroxide | 0.8 | — | — |
| HIMILAN 1605 | — | 40 | — |
| HIMILAN 1706 | — | 40 | — |
| SURLYN 8140 | — | — | 50 |
| SURLYN 9120 | — | — | 50 |
| RABALON T3221C | — | 20 | — |
| Hardness H3 (Shore D) | 56 | 55 | 69 |

RABALON T3221C: Thermoplastic styrene elastomer available from Mitsubishi Chemical Corporation.

TABLE 8

| Intermediate layer composition | d | e | f | g | h | i | j | k |
|---|---|---|---|---|---|---|---|---|
| SURLYN 8945 | 20 | 20 | 30 | 40 | 50 | — | 45 | 5 |
| HIMILAN AM7329 | 20 | 20 | 30 | 40 | 50 | — | 45 | 5 |
| PRIMALLOY B1942N*1) | — | — | — | — | — | 100 | — | — |
| LOTADER AX8840 | 1 | 1 | 3 | 5 | — | — | 5 | 5 |
| ARUFON UG-4030 | — | — | 2 | — | — | — | — | — |
| NOVAMID ST220*2) | 60 | — | 40 | 20 | — | — | — | 90 |
| AMILAN U141*3) | — | 60 | — | — | — | — | — | — |
| PEBAX 4033SA*4) | — | — | — | — | — | — | 10 | — |
| Titanium dioxide | 4 | 4 | 4 | 4 | 4 | 4 | 4 | 4 |

*1)Thermoplastic polyester elastomer available from Mitsubishi Chemical Corporation.
*2)Flexural modulus: 2,000 MPa
*3)Flexural modulus: 1,500 MPa
*4)Thermoplastic polyamide elastomer available from Arkema Inc., Flexural modulus: 84 MPa.

TABLE 9

| Cover composition | v | w | x | y | z |
|---|---|---|---|---|---|
| Elastollan XNY85A | — | — | 100 | 10 | 20 |
| Elastollan XNY97A | 80 | — | — | 90 | 80 |
| Elastollan XNY80A | — | 100 | — | — | — |
| Elastollan XNY1164D | 20 | — | — | — | — |
| Titanium dioxide | 4 | 4 | 4 | 4 | 4 |

TABLE 10

| | Golf ball No. | No. 16 | No. 17 | No. 18 | No. 19 |
|---|---|---|---|---|---|
| Center | Composition | i | ii | i | ii |
| | Diameter (mm) | 20.1 | 37.7 | 20.1 | 37.7 |
| | Compression deformation amount (mm) | 5.8 | 3.1 | 5.8 | 3.1 |
| Surrounding Layer | Composition | a | b | a | b |
| | Thickness (mm) | 9.8 | 1.0 | 9.9 | 1.0 |
| Inner core | Surface hardness H4 (Shore D) | 62 | 58 | 62 | 58 |
| Intermediate layer | Composition | d | d | e | f |
| | Hardness H5 (Shore D) | 67 | 67 | 70 | 67 |
| | Flexural modulus (MPa) | 450 | 450 | 495 | 400 |
| | Tensile modulus (MPa) | 540 | 540 | 600 | 560 |
| | Thickness (mm) | 1.0 | 1.0 | 1.0 | 1.0 |

TABLE 10-continued

|  |  | Golf ball No. | | | |
|---|---|---|---|---|---|
|  |  | No. 16 | No. 17 | No. 18 | No. 19 |
| Outer core*) | Surface hardness H6 (Shore D) | 69 | 69 | 72 | 69 |
| Cover | Composition | x | x | w | x |
|  | Hardness H7 (Shore D) | 32 | 32 | 27 | 32 |
|  | Thickness (mm) | 0.5 | 0.5 | 0.4 | 0.5 |
| Golf ball | Compression deformation amount (mm) | 2.35 | 2.40 | 2.30 | 2.40 |
| Driver (W#1) flight distance (m) | | 251.5 | 251.0 | 253.0 | 252.0 |
| Driver (W#1) spin rate (rpm) | | 2550 | 2570 | 2510 | 2530 |
| Short iron (SW) spin rate (rpm) | | 6550 | 6530 | 6567 | 6523 |
| Shot feeling | | A | A | B | A |
| Durability | | 115 | 118 | 113 | 120 |
| Low temperature durability | | 102 | 100 | 101 | 108 |

*)Sphere consisting of inner core and intermediate layer

TABLE 11

|  |  | Golf ball No. | | | | |
|---|---|---|---|---|---|---|
|  |  | No. 20 | No. 21 | No. 22 | No. 23 | No. 24 |
| Center | Composition | ii | i | i | i | ii |
|  | Diameter (mm) | 37.7 | 20.1 | 20.1 | 20.1 | 37.7 |
|  | Compression deformation amount (mm) | 3.1 | 5.8 | 5.8 | 5.8 | 3.1 |
| Surrounding Layer | Composition | b | a | a | a | b |
|  | Thickness (mm) | 1.0 | 9.8 | 9.8 | 9.8 | 1.0 |
| Inner core | Surface hardness H4 (Shore D) | 58 | 62 | 62 | 62 | 58 |
| Intermediate layer | Composition | g | e | h | i | j |
|  | Hardness H5 (Shore D) | 66 | 70 | 65 | 69 | 63 |
|  | Flexural modulus (MPa) | 390 | 495 | 282 | 400 | 260 |
|  | Tensile modulus (MPa) | 590 | 600 | 380 | 450 | 280 |
|  | Thickness (mm) | 1.0 | 1.0 | 1.0 | 1.0 | 1.0 |
| Outer core*) | Surface hardness H6 (Shore D) | 68 | 72 | 68 | 71 | 65 |
| Cover | Composition | z | y | x | x | x |
|  | Hardness H7 (Shore D) | 44 | 46 | 32 | 32 | 32 |
|  | Thickness (mm) | 0.5 | 0.5 | 0.5 | 0.5 | 0.5 |
| Golf ball | Compression deformation amount (mm) | 2.40 | 2.30 | 2.40 | 2.30 | 2.45 |
| Driver (W#1) flight distance (m) | | 250.5 | 253.5 | 249.0 | — | 247.5 |
| Driver (W#1) spin rate (rpm) | | 2590 | 2430 | 2630 | — | 2690 |
| Short iron (SW) spin rate (rpm) | | 6496 | 6404 | 6581 | — | 6632 |
| Shot feeling | | A | B | A | — | A |
| Durability | | 125 | 98 | 100 | — | 88 |
| Low temperature durability | | 113 | 100 | 100 | — | 90 |

*)Sphere consisting of inner core and intermediate layer

TABLE 12

|  |  | Golf ball No. | | | |
|---|---|---|---|---|---|
|  |  | No. 25 | No. 26 | No. 27 | No. 28 |
| Center | Composition | i | i | ii | iii |
|  | Diameter (mm) | 20.1 | 20.1 | 37.7 | 39.7 |
|  | Compression deformation amount (mm) | 5.8 | 5.8 | 3.1 | 2.7 |
| Surrounding Layer | Composition | a | a | c | — |
|  | Thickness (mm) | 9.8 | 9.8 | 1.0 | — |
| Inner core | Surface hardness H4 (Shore D) | 62 | 62 | 70 | 60(H2) |
| Intermediate layer | Composition | k | e | g | d |
|  | Hardness H5 (Shore D) | 76 | 70 | 66 | 67 |
|  | Flexural modulus (MPa) | 600 | 495 | 390 | 450 |
|  | Tensile modulus (MPa) | 960 | 600 | 590 | 540 |
|  | Thickness (mm) | 1.0 | 1.0 | 1.0 | 1.0 |
| Outer core*) | Surface hardness H6 (Shore D) | 78 | 72 | 68 | 69 |
| Cover | Composition | x | v | z | x |
|  | Hardness H7 (Shore D) | 32 | 52 | 44 | 32 |
|  | Thickness (mm) | 0.5 | 0.5 | 0.5 | 0.5 |
| Golf ball | Compression deformation amount (mm) | 2.25 | 2.30 | 2.25 | 2.40 |
| Driver (W#1) flight distance (m) | | 248.0 | 254.5 | 249.5 | 249.0 |
| Driver (W#1) spin rate (rpm) | | 2530 | 2350 | 2610 | 2620 |

TABLE 12-continued

| Golf ball No. | No. 25 | No. 26 | No. 27 | No. 28 |
|---|---|---|---|---|
| Short iron (SW) spin rate (rpm) | 6385 | 6224 | 6442 | 6590 |
| Shot feeling | C | D | C | B |
| Durability | 75 | 94 | 105 | 108 |
| Low temperature durability | 40 | 98 | 104 | 104 |

*)Sphere consisting of inner core and intermediate layer

As shown in tables No. 10 to 12, the golf balls of the present invention are excellent in various properties. This results clearly indicate that the present invention provides an excellent effect.

The present invention relates to a golf ball, and more specifically, is useful as a golf ball having excellent low temperature durability and flight distance.

The present invention provides the golf balls which can be used for playing in the golf course and practicing in the driving range.

This application is based on Japanese Patent applications No. 2008-181892 filed on Jul. 11, 2008, No. 2008-323356 filed on Dec. 19, 2008, and No. 2009-140164 filed on Jun. 11, 2009, the contents of which are hereby incorporated by reference.

The invention claimed is:

1. A golf ball comprising:
a core consisting of a center and one or more intermediate layers covering the center; and
a cover covering the core,
wherein at least one of said intermediate layers or a portion thereof is formed from a highly elastic intermediate layer composition that contains:
(A) a highly elastic polyamide resin having a flexural modulus in a range from 700 MPa to 5,000 MPa;
(B) a metal-neutralized product of ethylene-(meth)acrylic acid copolymer in an amount ratio ((A)/(B)) of (A) the highly elastic polyamide resin to (B) the metal-neutralized product of ethylene-(meth)acrylic acid copolymer of (20 mass % to 80 mass %)/(80 mass % to 20 mass %), the total being 100 mass %; and
(C) a resin having a polar functional group that is at least one selected from the group consisting of an ethylene-acrylic acid-glycidyl methacrylate copolymer and a methyl methacrylate-glycidyl methacrylate copolymer in an amount of 0.1 part by mass to 30 parts by mass with respect to 100 parts by mass of the sum of (A) the highly elastic polyamide resin and (B) the metal-neutralized product of ethylene-(meth)acrylic acid copolymer, and
wherein the cover is formed from a cover composition that contains a polyurethane resin as a main resin component.

2. The golf ball according to claim 1, wherein regarding slab properties, the highly elastic intermediate layer composition has a hardness in a range from 65 to 75 in Shore D hardness, a flexural modulus in a range from 300 MPa to 1,000 MPa, and a tensile modulus in a range from 400 MPa to 1,500 MPa.

3. The golf ball according to claim 1, wherein (A) the highly elastic polyamide resin is at least one selected from the group consisting of polyamide 6, polyamide 11, polyamide 12, polyamide 66, polyamide 610, polyamide 6T, polyamide 61, polyamide 9T, polyamide M5T, polyamide 612 and a polyetherblock amide copolymer.

4. The new golf ball according to claim 1, wherein the cover composition contains a thermoplastic polyurethane as the main resin component.

* * * * *